United States Patent
Han et al.

(10) Patent No.: US 10,840,988 B2
(45) Date of Patent: Nov. 17, 2020

(54) ELECTRONIC DEVICE, METHOD FOR SAME AND INFORMATION PROCESSING DEVICE

(71) Applicant: Sony Corporation, Tokyo (JP)

(72) Inventors: Di Han, Beijing (CN); Bo Bai, Beijing (CN); Wei Chen, Beijing (CN); Xin Guo, Beijing (CN); Shuai Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/309,941

(22) PCT Filed: Jun. 7, 2017

(86) PCT No.: PCT/CN2017/087416
§ 371 (c)(1),
(2) Date: Dec. 14, 2018

(87) PCT Pub. No.: WO2017/219863
PCT Pub. Date: Dec. 28, 2017

(65) Prior Publication Data
US 2019/0165848 A1 May 30, 2019

(30) Foreign Application Priority Data
Jun. 21, 2016 (CN) .......................... 2016 1 0453398

(51) Int. Cl.
*H04B 7/06* (2006.01)
*H04B 17/309* (2015.01)
(Continued)

(52) U.S. Cl.
CPC ......... *H04B 7/0628* (2013.01); *H04B 7/0617* (2013.01); *H04B 17/309* (2015.01);
(Continued)

(58) Field of Classification Search
CPC ... H04W 28/08; H04W 72/046; H04W 24/10; H04W 28/0247; H04W 72/087;
(Continued)

(56) References Cited

U.S. PATENT DOCUMENTS

2006/0166618 A1\* 7/2006 Bakaimis ............... H04B 7/155
455/11.1
2007/0165581 A1 7/2007 Mehta et al.
(Continued)

FOREIGN PATENT DOCUMENTS

CN 102123480 A 7/2011
CN 104394572 A 3/2015
(Continued)

OTHER PUBLICATIONS

English-language translation of International Search Report for International Application No. PCT/CN2017/087416, dated Aug. 24, 2017.

*Primary Examiner* — Maharishi V Khirodhar
*Assistant Examiner* — Kenneth P Hunt
(74) *Attorney, Agent, or Firm* — Xsensus LLP

(57) ABSTRACT

Provided are an electronic device for a network control terminal and a network node, and a method for the electronic device. The electronic device for a network control terminal comprises processing circuitry configured to set a first condition concerning a beam-forming capacity of a network node for determining the network node capable of serving as a relay node, and to generate control signaling of indication information comprising the first condition for indicating the network node served by the network control terminal.

18 Claims, 17 Drawing Sheets

(51) Int. Cl.
*H04W 24/10* (2009.01)
*H04W 28/02* (2009.01)
*H04W 28/08* (2009.01)
*H04W 40/22* (2009.01)
*H04W 72/04* (2009.01)
*H04W 72/08* (2009.01)

(52) U.S. Cl.
CPC ....... *H04W 24/10* (2013.01); *H04W 28/0247* (2013.01); *H04W 28/08* (2013.01); *H04W 40/22* (2013.01); *H04W 72/046* (2013.01); *H04W 72/087* (2013.01)

(58) Field of Classification Search
CPC ... H04W 40/22; H04B 17/309; H04B 7/0628; H04B 7/0617; H04B 7/1555; H04B 7/15571; H04B 7/0408; H04B 7/0452; H04B 7/0697; H04B 7/14; H04B 7/15; H04B 7/155; H04B 7/15507; H04B 7/15514; H04B 7/15528; H04B 7/15535; H04B 7/15542; H04B 7/15555; H04B 7/15564

See application file for complete search history.

(56) References Cited

U.S. PATENT DOCUMENTS

2009/0047898 A1\* 2/2009 Imamura ................ H04B 7/155
 455/7
2010/0110968 A1\* 5/2010 Lee ...................... H04B 7/2606
 370/315
2017/0317726 A1\* 11/2017 Abdallah ............. H04B 17/318

FOREIGN PATENT DOCUMENTS

CN 104684042 A 6/2015
CN 105007608 A 10/2015

\* cited by examiner

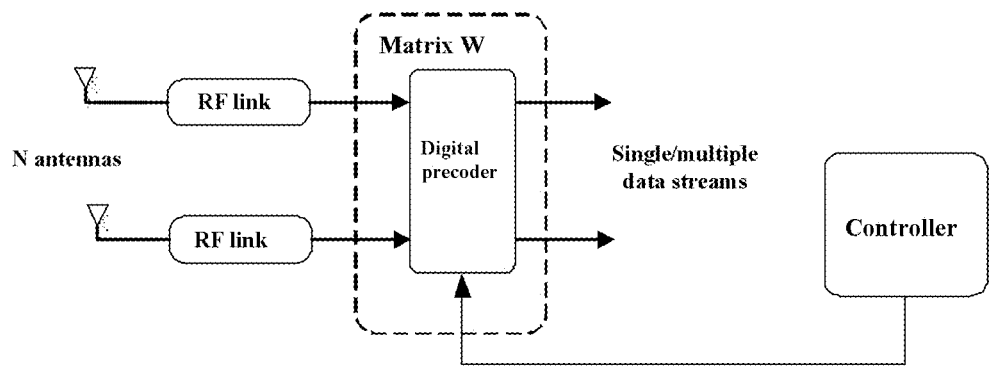

Figure 4

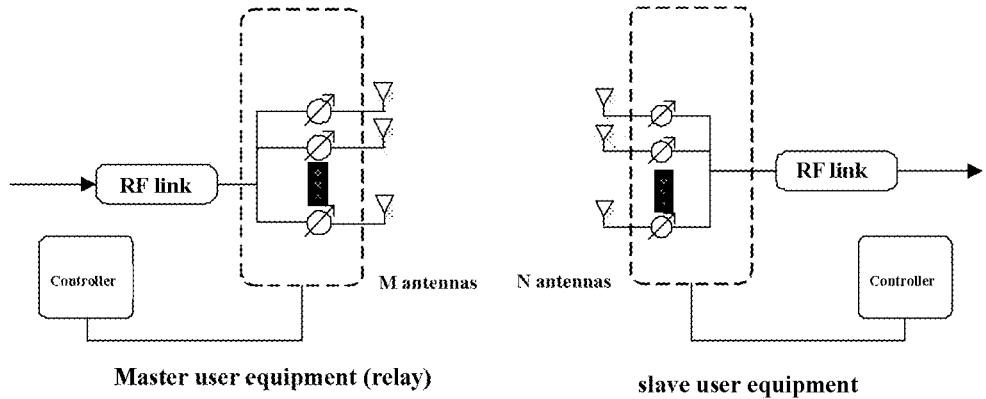

Figure 5

```
discConfigRelay-r13              SEQUENCE {
        discThreshHiRelayUE-r13        RSRP-Range                      OPTIONAL,
   -- Need OR
        discThreshLoRelayUE-r13        RSRP-Range                      OPTIONAL,
   -- Need OR
        discHystMaxRelayUE-r13         ENUMERATED {dB0, dB3, dB6, dB9, dB12,
dBinf},
        discHystMinRelayUE-r13         ENUMERATED {dB0, dB3, dB6, dB9, dB12},
            -- Uu threshold
        discThreshHiRemoteUE-r13       RSRP-Range                      OPTIONAL,
   -- Need OR
        discHystMaxRemoteUE-r13        ENUMERATED {dB0, dB3, dB6, dB9, dB12},
            -- Uu threshold
        reselectionInfoRemoteUE-IC-r13 ReselectionInfoRelay-r13
        discBeamsThreshLoRelayUE-r13+n     INTEGER {1...n},
   OPTIONAL,    -- Need OR
        }
```

Figure 6

```
commTxResourceInfoReqRelay-r13        SEQUENCE {
    commTxResourceReqRelay-r13            SL-CommTxResourceReqUC-r13,
    ue-Type-r13                       ENUMERATED {relayUE, remoteUE}
    commTxResourceReqRelay-r13+n          SL-CommTxResourceReqMC-r13+n,
    BF-Type-r13+n                     ENUMERATED {on, off}
}                                                              OPTIONAL,
SL-CommTxResourceReqMC-r13+n ::=      SEQUENCE {
    carrierFreq-r13+n                     ARFCN-ValueEUTRA-r9       OPTIONAL,
    destinationInfoListMC-r13+n           SL-DestinationInfoListMC-r13+n
}
```

Figure 7

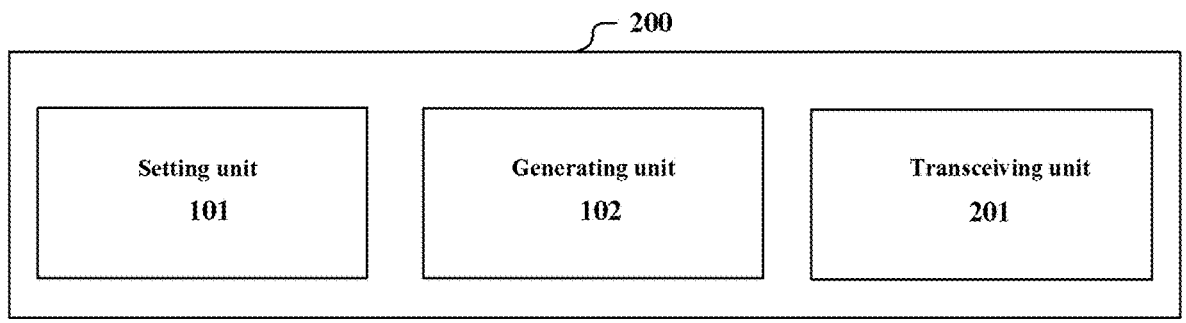

Figure 8

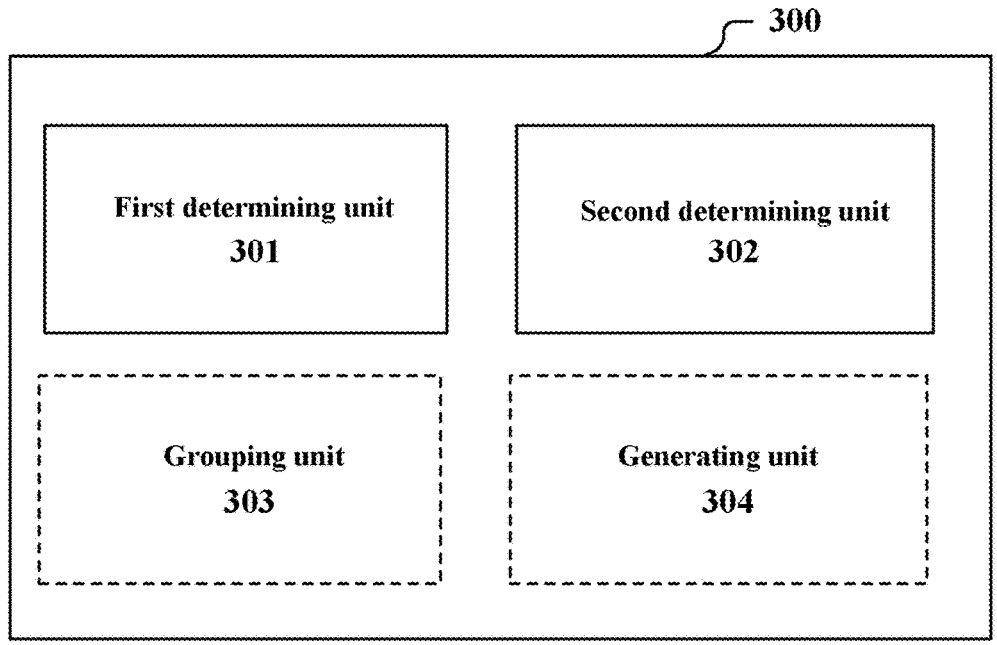

Figure 9

ELECTRONIC DEVICE, METHOD FOR SAME AND INFORMATION PROCESSING DEVICE

CROSS-REFERENCE TO RELATED APPLICATIONS

This application is a National Stage Application based on PCT/CN2017/087416, filed on Jun. 7, 2017, and claims priority to Chinese Application No. 201610453398.3, titled "ELECTRONIC DEVICE, METHOD FOR SAME AND INFORMATION PROCESSING DEVICE", and filed with the State Intellectual Property Office of People's Republic of China on Jun. 21, 2016, each of which are incorporated herein by reference in their entireties.

FIELD OF THE INVENTION

The embodiments of the present disclosure generally relate to the field wireless communications, particularly to relay wireless communications, and more particularly to an electronic device for a network control terminal and a method for the electronic device, an electronic device for a network node and a method for the electronic device, and an information processing device.

BACKGROUND OF THE INVENTION

With rapid development of wireless communication and electronic industry, spectrum resources for wireless communications are increasingly in a shortage, and requirements of the users for capacity and reliability of the communication systems are increasingly higher. There are abundant spectrum resources in a high-frequency millimeter wave band, which can effectively reset the above requirements of the users.

However, the millimeter wave communications cannot be supported by the protocol used by the existing LTE communication system. Since the millimeter waves are absorbed by oxygen, water vapor and rain during propagation in the atmosphere and are thus attenuated greatly, an effective distance of point-to-point communications is very short. In this case, although it is difficult to steal or interfere with signals and security is improved in some extent, a converge range of a device at a base station side is greatly reduced. In a case that the user equipment is far away from the base station, the user equipment cannot directly communicate with the base station and a relay is required to be provided.

In the conventional LTE technology, the relay node, generally as the infrastructure deployed by the operator at a particular position of a cell, is very respective. With the development of the proximity-based service (Prose) communications, the Prose user equipment to a network relay (Prose UE-to-Network Relay) technology occurs, but generally the user equipment can only support one-to-one relay. In some applications such as machine-type communications or Internet-of-Things, a large number of connections are required, and the conventional one-to-one relay manner is low in operation efficiency, which cannot meet the requirement of the users. In another aspect, wireless communication resources are increasingly in a shortage, and how to further reasonably implement resource multiplexing is an important issue in the development of the next-generation communication technology.

SUMMARY OF THE INVENTION

In the following, an overview of the present invention is given simply to provide basic understanding to some aspects of the present invention. It should be understood that the overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an embodiment of the present application, an electronic device for a network control terminal is provided, which includes processing circuitry configured to: set a first condition about bema-forming capability of network node, to be used for determining a network node which is capable of serving as a relay node; and generate control signaling containing indicating information of the first condition, for instructing network nodes served by the network control terminal.

According to another aspect of the present application, an electronic device for a network node is provided, which includes processing circuitry configured to determine, based on control signaling from a network control terminal, a first condition about beam-forming capability of the network node; and determine, based on the first condition. whether the present network node is to operate as a relay node.

According to an embodiment of the present application, a method for an electronic device of a network control terminal is provided, which includes: setting a first condition about beam-forming capability of a network node, to be used for determine network node which is capable of serving as relay node; and generating control signaling containing indicating information of the first calculation, for instructing network nodes served by the network control terminal.

According to another aspect of the present application, a method for an electronic device of a network node is provided, which includes: determining, based on control signaling form a network control terminal, a first condition about beam-forming capability of the network node; and determining, based on the first condition, whether the network node is to operate as a relay node.

According to other aspects of the present disclosure, there are further provided computer program codes and computer program products for methods for the electronic device as well as a computer-readable storage medium recording the computer program codes for implementing the methods.

A relay node is determined based on the beam-forming capability of the network node in the electronic device and the method according to the embodiments of the present disclosure, thereby enlarging a communication scope, improving communication quality and spectrum resource utilization efficiency.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

FIG. 4 is a schematic diagram of a structure of a user equipment terminal having multiple antennas of the prior art;

FIG. 5 is a schematic diagram of hardware of a transceiving terminal of a network node equipped with multiple antennas;

FIG. 6 is a schematic diagram of composition of an information element SystemInformationBlockType19 of system information based on the improved LTE protocol according to an embodiment of the present disclosure;

FIG. 7 is a schematic diagram of composition of an information element confirm TxResourceInfoReqRelay based on the improved LTE protocol according to an embodiment of the present disclosure;

FIG. 8 is a functional block diagram of an information processing device according to an embodiment of the present disclosure;

FIG. 8 is a functional block diagram of an electronic device for a network node according to an embodiment of the present disclosure;

FIG. 9 is a functional block diagram of an electronic device for a network node according to an embodiment of the present disclosure;

DETAILED DESCRIPTION OF THE EMBODIMENTS

All exemplary embodiment of the present invention will be described hereinafter in conjunction with accompanying drawings. For the purpose of conciseness and clarity, and all features of an embodiment are described in this specification. However, it should be understood that multiple decisions specific to the embodiment have to be made in a process of developing any such embodiment to realize a particular object of a developer. For example, conforming to those constraints related to a system and a business, and these constraints may change as the embodiments differs. Furthermore, it should also be understood that although file development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

<First Embodiment>

Figure 1:
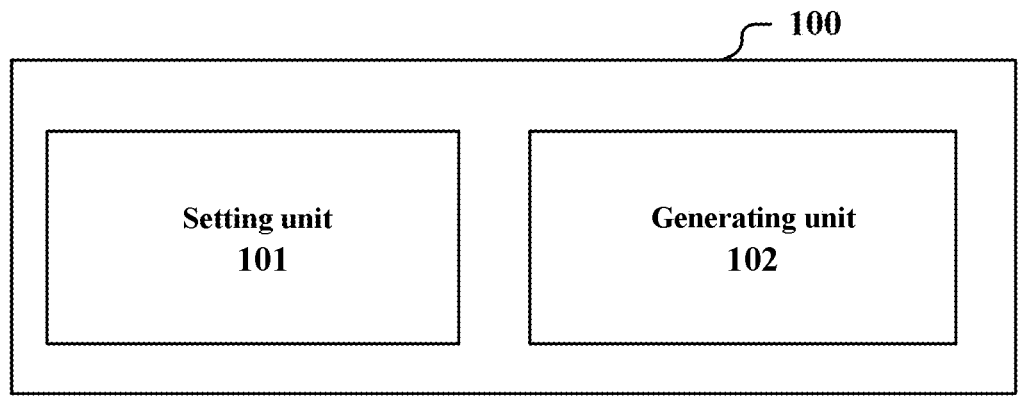
FIG. 1 is a functional block diagram an electronic device for a network control terminal according to an embodiment of the present disclosure.

FIG. 1 is a functional block diagram of an electronic device 100 for a network control terminal according to an embodiment of the present disclosure. The electronic device 100 includes: a setting unit 101, configured to set a first condition about beam-forming capability of a network node, to be used for determining a network node which can serve as a relay node; and a generating unit 102, configured to generate control signaling containing including information of the first condition, for instructing network nodes served by the network control terminal.

The setting unit 101 and the generating unit 102 may be implemented by the example one or more processing circuitries, and the processing circuitries may be implemented as for example a chip.

The network control terminal refers to an entity in a communication system for realizing a function such as relevant setting and controlling, and communication resource allocation of a communication activity. The network control terminal is for example a base station in a cellular communication system, or a baseband cloud device in the Cloud-RAN/Centralized-RAN (C-RAN) architecture (there may be no concept of a cell) such as any BBU in BBU pools which are connected at a high speed in the C-RAN architecture. The network node refers to an entity in a communication system for realizing a communication objective using communication resources, such as various user equipments (such as a mobile terminal, an intelligent vehicle, an intelligent wearable device and the like having cellular communication capability) or a network infrastructure such as a small cell base station.

For example, in millimeter wave communications, since path loss of the millimeter wave is large, an effective communication distance is short. Therefore, a network node at an edge of a coverage range of the network control terminal may not directly communicate with the network control terminal. In this case, indirect communication between the network node at the edge and the network control terminal can be realized by providing a relay node. That is, in downlink, the network control terminal transmits information to the relay node, and the relay node forwards the information to the network node at the edge in a manner of for example decoding and forwarding or amplifying and forwarding (a similar manner is used in uplink.)

Since a wavelength of the millimeter wave is short, the network node may be equipped with multiple antennas in limited deployment space, so that the network node has beam-forming capability.

Figure 2:
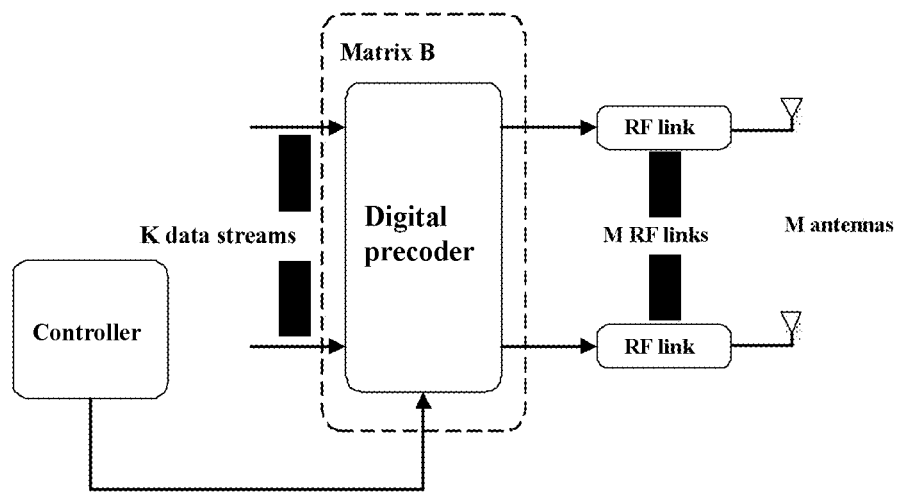
FIG. 2 is a schematic diagram of a structure of a base station of the prior art.
Figure 3:
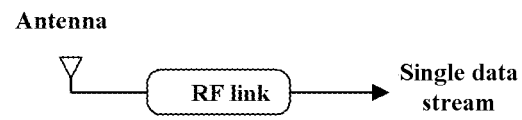
FIG. 3 is a schematic diagram of a structure of a user equipment terminal having a single antenna of the prior art.

The beam-forming may include a digital beam-forming architecture and an analog beam-forming architecture. The digital beam-forming architecture may be implemented by digital precoding. Each of the antennas is connected to a radio frequency (RF) link, and an amplitude of a signal transmitted in each of the radio frequency links can be regulated, to reduce mutual interferences amount multi-channel data signals carried on the same transmission resources. FIG. 2 shows a structure of a base station of the prior art. As shown in FIG. 2, in the digital precoding architecture, the base station is equipoised with M antennas (M is an integer and is greater than or equal to 1), and each of the M antennas is provided with a corresponding ratio frequency link. A digital precoder obtains K-channel data streams (K is an integer and is greater than or equal to 1) under control of a controller, and performs digital precoding on the K-channel data streams (for example, causes the K-channel data streams to pass through a digital precoding matrix B with the size of M×K). The coded data is transmitted to one or more users through the radio frequency links and the antennas. The user equipment can be equipped with one single antenna or multiple antennas, as shown in FIG. 3 and FIG. 4 respectively. In a case that the user equipment is equipped with one single antenna, the user equipment can only receive one channel data stream among the K-channel data streams. In a case that the user equipment is equipped with N antennas (N is an integer and is greater than 1), data received by each of the N antennas is transmitted to a digital precoder through a radio frequency link corresponding to the antenna. Under control of the controller, the digital precoder performs digital precoding on the received data using a digital precoding matrix W with the size of Ku×N (Ku is an integer and is greater than or equal to 1), to obtain single-channel data (in the case of Ku=1) or multi-channel data (in the case of Ku>1).

In the analog beam-forming architecture, the beam-forming capability may be also referred to as an antenna orientation capability, that is, a capability of transmitting a beam in a specific direction. For example, the radio frequency links are connected to multiple phase shifters and antennas, and at least one radio frequency link is used to form a directional beam, so as to realize the analog beam-forming solution.

Therefore, in a case that the network node having the beam-forming capability operates as a relay node, one-to-many relay can be realized. In another aspect, the beam-forming can effectively reduce or avoid interferences, to improve communication quality of a communication link. For example, in the analog beam-forming architecture, the directional beam is generated, and the same spectrum resources may be allocated to and used by two or more network nodes in different directions simultaneously, thereby realizing spatial multiplexing of the spectrum resources while ensuring that interferences are lower than a predetermined threshold. In another aspect, in a case that the network node with the beam-forming capability operates as a relay node, the network node may also communicate with the network control terminal using the beam-forming so that the network node, other relay node or a normal network node can communicate with the network control terminal by multiplexing the spectrum resources (which is equivalent to performing bean-forming in a backhaul link of the ProSe communication), thereby improving a spectrum utilization ratio.

FIG. 5 is a schematic diagram showing hardware of a transcribing terminal of a network node (for example user equipment) equipped with multiple antennas. In FIG. 5, a relay node is shown at the left side, and a slave network node which communicates with the network control terminal (for example, a base station) through the relay node is shown at the right side. It can be seen that one radio frequency link is connected to multiple antennas, and each of the antennas is provided with a phase shifter. The phase shifter for each of the antennas is regulated to generate a directional beam. At the receiving terminal, the phase shifter is regulated to regulate the antenna to a corresponding direction so as to receive a signal.

It should be understood that although the description for multiple antennas is made by taking the millimeter wave band as an example, it is not limited thereto. The multiple antennas may also be applied in other wave band such as a microwave band or a wave band having a smaller wavelength than the millimeter wave band.

In the embodiment, a relay node is determined by setting a first condition about beam-forming capability, and a network node having the beam-forming capability may be selected as the relay node, to perform one-to-many relay. Therefore, spatial multiplexing of spectrum resources can be implemented while for example enduring quality of each sidelink, thereby improving spectrum resources utilization efficiency, and improving system capacity.

In an example, the first condition may include a threshold for the number of directional beams which can be formed, and/or a threshold for a range of angles of the directional beams. However, the setting of the first condition is not limited thereto. For example, the first condition may just be set as whether network node has the beam-forming capability.

It should be understood that the first condition may not only include a specification about beam-forming capability of a network node which can operate as a relay node, but also include a specification about beam-forming capability of network node which can operate a slave network node of a relay node. The slave network node is a network node which communicates with the network control terminal through the relay node. Hereinafter, the relay node is also referred as a master network node, and the network node which accesses into the relay node to indirectly communicate with the network control terminal is referred as the slave network node. In addition, a network node which does not comply with the two specifications for the first condition is a common node, which can directly communicate with the network control terminal.

In another aspect, the setting unit 101 may further set a second condition about link quality for the network node, to be used for determining a network node which can serve as a relay node. Correspondingly, the generating unit 102 further generates the control signaling further containing indicating information of the second condition.

The second condition is set to ensure that communication quality of the selected relay node meets a certain requirement. For example, the second condition may be a threshold of the link quality. For example, only a network node having link quality higher than a certain threshold may be determined as a relay node, thereby ensuring operation stability of the relay node.

In an example, the link quality may be indicated by reference signal receiving power (RSRP) pf reference signal receiving quality (RSRQ). In addition, the link quality may also be indicated by an upper limit of channel capacity in unit bandwidth.

The setting unit 101 may be configured to set the second condition based on one or more of a distribution density of network nodes, a coverage range of the network control terminal and a target transmission rate of the network node. For example, in a case that the distribution density of the network nodes is large, it means that a large number of network nodes are carried by the relay node on average, and thus good link quality for the relay node itself is required, and a large threshold of the link quality is required to be set. In a case that the coverage range is large, an area in which the relay node provides service is large accordingly, and thus a large threshold of the link quality is also required to bet set. In a case that the target transmission rate of the network node is large, it means that load of the relay node is increased, and thus a large threshold of link quality is required to be set.

In addition, similarly, the second condition may not only include a specification about link quality for a network node which can operate as a relay node, but also include a specification about link quality for a network node which can operate as a slave network node. In other words, a network node which does not comply with the two specifications of the second condition would serve as a common node, which directly communicates with the network control terminal. For example, in an example that the second condition involves a threshold of the link quality, a first threshold which should be satisfied when the network node operates as the relay node and a second threshold which should be satisfied when the network node operates as the slave network node may be set. For example, a network node having link quality greater than the first threshold can serve as the relay node, and a network node having link quality lower than the second threshold can serve as the slave network node.

In a case that both the first condition and the second condition are set by the setting unit 101, the setting unit 101 may set respective weights for the first condition and the second condition. the generating unit 102 generates the control signaling containing information of the weights. The weight indicates a proportion of a decisive role of the first condition or the second condition in determining the network node which is to serve as the relay node.

For example, the setting unit 101 may determine the weights based on a spectrum resource state and/or interference conditions of the system. For example, in a case that spectrum resources of the system are in a shortage, it is more desirable to fully utilize the spectrum resources of the system. In this case, spatial multiplexing capability for spectrum resources resulting from the beam-forming capability of the network node is more attractive. Therefore, the setting unit 101 sets a larger weight for the first condition, that is, a larger weight is assigned to network node having the beam-forming capability or having stronger bema-forming capability. On the contrary, in a case that there are relatively abundant spectrum resources, the setting unit 101 sets a smaller weight to the first condition, i.e., taking link quality for the network node into consideration to a larger extent. It should be understood that the network control terminal can easily obtain a current state of the spectrum resources of the system. As a simple example, the network control terminal may determine weather the spectrum resources are abundant based on a current distribution density of the network nodes. For example, in another aspect, in a case that serious interferences exist in the system, it is desirable to reduce the interferences by spatial multiplexing of the spectrum resources, and thus the setting unit 101 sets a larger weight for the first condition.

Generally, a network node having the beam-forming capability may activate a beam-forming function or not. For example, in the millimeter wave communications, the network node may have capability of using a directional antenna and an omnidirectional antenna, and may determine whether to activate the directional antenna by itself. Therefore, the setting unit 101 may further set an additional condition indicating application of the first condition. In other words, the additional condition is required to be satisfied when the network node is to apply the beam-forming function related to the first condition.

In an example, the additional condition involves one or more of the following: the network node with the bean-forming capability permits activating a beam-forming function; electricity amount of the network node with the beam-forming capability is higher than a predetermined threshold; spectrum resources of a system are insufficient; and activating the beam-forming function can reduce overall interferences of the system.

It should be understood that the beam-forming function is activated under the permission of the network node. In another aspect, since a large number of antennas in an antenna array are required to be used for beam-forming when the network node activates the beam-forming function, power consumption is larger as compared with a case of using the omnidirectional antennas. Therefore, the beam-forming function can be supported only in a case that electricity amount of the network node is sufficient. The judgement for the additional condition may be performed by the network node, or by the network control terminal, which is not limited.

For example, the network control terminal may determine, based on a density of the network nodes, a requirement for a communication rate, available spectrum resources of the system and interference conditions of the system or other information, whether activating the beam-forming function is necessary. For example, in a case that the spectrum resources of the system are insufficient or activating the beam-forming function can reduce overall interferences of the system, it is determined that activating the beam-forming function is necessary.

As an example, the setting unit 101 may be further configured to allocate a resource pool to the relay node, and the generating unit 102 may be further configured to incorporate indicating information of the resource pool into the control signaling. In other words, the setting unit 101 pre-allocates spectrum resources to the network node which is to operate as the relay node while setting a selection condition for the relay node. After determining to operate as the relay node, the network node may directly use spectrum resources in the resource pool to perform relay communication, without further intervention of the network terminal.

It should be understood that the control signaling described herein may be implemented as one piece of signaling in some examples, and may include multiple pieces of signaling in other examples. The multiple pieces of signaling are transmitted by the network control terminal respectively. For example, control signaling about the first condition, control signaling about the second condition and control signaling about the resource pool are transmitted respectively. In practice, the above manner of transmitting the control signaling is exemplary, and transmitting manner of the control signaling is not limited.

The control signaling may be broadcast signaling. Specifically, the network control terminal transmits the above control signaling to all network nodes in a coverage range of the network control terminal through a broadcast channel. As an example, indicating information of the control signaling may be contained in system information improved based on the LTE protocol. For example, the indicating information may be implemented as an information element SystemInformationBlock18 or an information element SystemInformationBlock19. In the conventional LTE protocol, the information element SystemInformationBlock19 contains an uplink quality condition of user equipment (UE) as a relay node and an uplink quality condition of a remote UE which is relayed. Based on this, discBeamsThreshLoRelayUE-r13+n is added, in which r13+n represents a version number, and may be appropriately modified to be a version number of the protocol used actually, and discBeamsThreshLoRelayUE represents a threshold for the number of directional beams which can be formed, and ranges from 1 to n. As shown in FIG. 6, the control signaling may also be dedicated signaling alternatively.

In another example, the setting unit 101 may not pre-allocate the resource pool, and allocate spectrum resources to a master network node based on configuration information from the master network node. The master network node is a network node determined as the relay node. The configuration information includes grouping information of slave network nodes to be served by the master network node. The slave network nodes in the same group are subjected interferences lower than a predetermined degree when using the same time-frequency resources to transmit data in a case of beam-forming. In other words, the master network node may use the same time-frequency resources to transmit data to the slave network nodes in the same group by spatial multiplexing, to maintain the interferences within a desired range.

In the example, upon receiving the control signaling at least containing the indicating information of the first condition from the network control terminal, the network node determines weather to operate as a relay node by itself. In a case of determining to operate as the relay node, the network node becomes a master network node, allows one or more slave network nodes to access, groups the slave network nodes according to the above rules, and then generates configuration information based on grouping. The setting unit 101 may allocate spectrum resources to the master network node based on the grouping. It should be understood that the allocated spectrum resources may include both spectrum resources to be used for relay communication between the master network node and the slave network node, and spectrum resources to be used for communication between the master network node and the network control terminal. Alternatively, the same spectrum resources may be used for the above mentioned two aspects of communications.

The master network node and all the slave network nodes thereof may be referred to as a node cluster hereinafter. The setting unit 101 may try to allocate different resource blocks to adjacent node clusters when allocating spectrum resources to multiple node clusters, to reduce interferences among clusters.

For example, the above configuration information may be a message SidelinkUEInformation improved based on the LTE protocol, and may be an information element commTxResourceInfoReqRelay. As compared with the information element commTxResourceInfoReqRely in the conventional LTE protocol, commTxResourceReqRelay is added in the present disclosure, to indicate identifiers of multi-point transmission destinations for relay communication transmission to which spectrum resources are to be allocated, that is, identifiers of the slave network nodes in the node cluster, and is valued SL-CommTxResourceReqMC. SL-CommTxResourceReqMC contains destinationInfoListMC, to indicate a multi-point transmission address, and is valued SL -CommTxResourceReqMC, as shown in FIG. 7.

In addition, the configuration information may further include information on whether the master network node is to activate the beam-forming. In a case that the configuration information is the improved SidelinkeUEInformation message BF-Type (valued ON or OFF) may be added in the information element commTxResourceReqReplay to indicate the information, as shown in FIG. 7.

Alternatively, the network control terminal determines whether the master network node activates the beam-forming function based on grouping information and the like. For example, the network control terminal may analyze, based on the system information and the grouping information, whether interferences can be reduced significantly when the master network node activates the beam-forming function, and determine to activate the beam-forming function in a case that the interferences can be reduced significantly. In this case, the network control terminal may make a determination by considering synthetically a spectrum resource image state and/or an interference conditions of the whole system, to improve whole performance.

In the above example, the network node may determine whether to serve as a relay mode by itself without the need of confirmation from the network control terminal. However, the setting unit 101 can also be configured to select, based on a request from a network node intending to serve as a relay node, the artwork node as the master network node, and the generating unit 102 generates a notification with respect to the master network node intending to serve as a relay node, the network node as the master network code, and the generating unit 102 generates a notification with respect to the master network node correspondingly. The request may include for example information about beam-forming capability of the corresponding network node. The corresponding master network node may allow the slave network nodes to access as described above upon receiving the above notification, and group the slave network nodes.

In this case, the notification may further include spectrum resources allocated to the master network node. The master network node does not need to transmit configuration information to the network control terminal subsequently, in a case that the notification includes the spectrum resources. Alternatively, the network control terminal may further allocate spectrum resources for relay communication to be performed by the master network node after the master network node transmits the configuration information (including the grouping information) to the network control terminal.

Whether the master network node is to activate the beam-forming function may be determined by the network control terminal, or by the master network node itself. In a case that whether the master network node is to activate the beam-forming function is determined by the network control terminal, an indication about whether the master network node is to activate the beam-forming function may be contained in the above notification, or the indication may be transmitted by the network control terminal when allocating the spectrum resources to the master network node based on the configuration information. In a case that whether the master network node is to activate the beam-forming function is determined by the master network node itself, the master network node may determine whether to activate the beam-forming function before or after grouping the above network nodes, and a determination result may be contained in the configuration information as necessary, to be provided to the network control terminal.

It should be understood that, in thee embodiment, the communication between the network control terminal and the master network node may be performed in a microwave band or a millimeter wave band, and the communication between the master network node and the slave network node may also be performed in a microwave band or a millimeter wave band, which may be combined arbitrarily and is not limited.

With the electronic device 100 according to the embodiment, the first condition about the beam-forming capability is set, so that a network node with the beam-forming capability serves as a relay node, to implement spatial multiplexing of spectrum resources, and thus implement for example one-to-many relay, thereby improving spectrum resource utilization efficiency, and improving system capacity and communication quality.

<Second Embodiment>

FIG. 8 is a functional block diagram an information processing device 200 according to an embodiment of the present disclosure. The information processing device 200 includes: a setting unit 101, configured to set a first condition about beam-forming capability of a network node, to be used for determining a network node which can serve as a relay node, a generating unit 102, configured to generate control signaling containing indicating information of the first condition, for instructing network nodes served by the network control terminal; and a transcribing unit 201, configured to transmit the control signaling to the network node.

The setting unit 101 and the transcribing unit 201 have the same function and structure as the setting unit 101 and the transcribing unit 201 according to the first embodiment described with reference to FIG. 1, respectively, and related description is already given in the first embodiment, and is also applicable in the second embodiment, which is not described repeatedly anymore.

In an example, the transcribing unit 201 is further configured to receive configuration information from the master network node, so that the processing circuitry allocates spectrum resources to the master network node based on the configuration information. The configuration information includes grouping information of the slave network nodes to be served by the master network node. The slave network nodes in the same group are subjected to interferences lower than a predetermined degree when using the same time-frequency resources to transmit data in a case of beam-forming. Similar to the first embodiment, the configuration information may further include information on whether the master network node is to activate the beam-forming function.

In addition, the transcribing unit 201 may further transmit a notification to the network node determined as the relay node, to notify that the network node is allowed to serve as a relay node. The setting unit 101 may determine a relay node based on a request form the network node. The notification may further include spectrum resources allocated to the relay node. In addition, the notification may further include indicating information on whether the relay node is to activate the beam-forming function.

The transcribing unit 201 may operate in a millimeter wave band or a microwave band.

The setting unit 101 and the transcribing unit 201 may be implemented by for example one or more processing circuitries. The processing circuitry may be implemented as for example a chip. The transcribing unit 201 may be implemented as for example an antenna or an antenna array.

<Third Embodiment>

FIG. 8 is a functional block diagram of an electronic device 300 for a network node according to another embodiment of the present disclosure. The electronic device 300 includes: a first determining unit 301, configured to determine, based on control signaling from a network control terminal, a first condition about beam-forming capability of a network node; and a second determining unit 302, configured to determine, based on the first condition, whether the present network node is to operate as a relay node.

Similar to the first embodiment, the first condition may include a threshold for the number of directional beams which can be formed, and/p a threshold for a range of angles of the directional beams. Alternatively, the first condition may only involve whether a network node has beam-forming capability.

In addition, the first determining unit 301 may be further configured to determine, based on the control signaling, a second condition about link quality for a network node, and the second determining unit 302 is configured to determine, based on both the first condition and the second condition, whether the present network node is to operate as a relay node. The link quality is indicated by for example RSRP, RSRQ or an upper limit of channel capacity per unit bandwidth.

In an example, the first determining unit 301 is further configured to determine, based on the control signaling, respective weights for the first condition and the second condition. The second determining unit 302 weights the two conditions using the respective weights in determination, and determines weather the present network node is to operate as the relay node by synthetically considering the weighted results.

In another example, the first determining unit 301 is further configured to determine, based on the control signaling, an additional condition indicating application of the first condition. For example, the additional condition involves one or more of the following: the network node with the beam-forming capability permits activating a beam-forming function; electricity amount of the network node with the beam-forming capability is higher than a predetermined threshold; spectrum resources of a system are insufficient; and activating the beam-forming function can reduce overall interferences of the system.

The first condition, the second condition and the additional condition are already described in detail in the first embodiment. The description is also applicable in the present embodiment, and is not repeated here anymore.

As described above, the second determining unit 302 determines, based on the condition involved in the control signaling, weather the present network node is to operate as the relay node (a master network node), or whether the present network node is to communicate with the network control terminal through a relay node, that is, whether the present network node is to operate as a slave network node. In a case that the network node does not operate as the master network node or the slave network node, the network node operates as a common network node, which directly communicates with the network control terminal.

In a case that weather the present network node is to operate as the relay node does not require a further confirmation from the network control terminal, the present network node may operate as a relay node in a case that it is determined that the present network node is to operate as the relay node. For example, the present network node subsequently broadcasts a pilot signal to all other network nodes. In a case that a slave network node selects to access into the present network node having an optimal channel condition and optimal link quality with respect to the slave network node, by comparing pilot signals received from several master network nodes for example, the slave network node transmits an access request to the present network node. The present network node transmits a connection feedback response to the slave network node subsequently, to establish a connection with the slave network node. In this way, a node cluster including the master network node and the slave network nodes of the master network node is formed, and there may be multiple node clusters in a coverage range of the network control terminal.

With reference to FIG. 9 again, as shown in a dashed line block in FIG. 9, the electronic device 300 may further include a grouping unit 303, configured to group the slave network nodes accessing into the present network node. The slave network nodes in the same group are subjected to interferences lower than a predetermined degree when using the same time-frequency resources to transmit data in a case of beam-forming.

In an example, the grouping unit 303 groups the slave network nodes based on an interference map. The interference map represents interference conditions amount respective slave network nodes when using the same time-frequency resources for communication in the case of beam-forming. For example, an interference map is generated for each node cluster, and disjoint independent sets (that is, groups) in the interference map is searched for using algorithms such as coloring algorithm. The slave network nodes in each independent set are subjected to interferences lower than a predetermined degree when using the same beam-frequency resources to transmit data in the case of beam-forming. In this case, the master network node may allocate the same time slots and the same resource blocks for all of the slave network nodes in one independent set.

Figure 10:
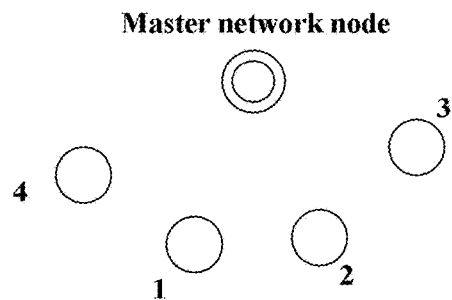
FIG. 10 is a schematic diagram showing an actual scenario of a node cluster.

FIG. 10 is a schematic diagram showing an actual scenario of a node cluster, in which, a double circle represents a master network node, four circles represent slave network nodes respectively, and a number beside the circle represents a serial number of the slave network node corresponding to the circle.

Figure 11:
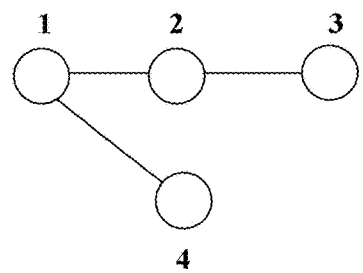
FIG. 11 shows an example of an interference map corresponding to the node cluster shown in FIG. 10.

FIG. 11 shows an interference map corresponding to the node cluster in FIG. 10. For example, each of the above network nodes is regarded as a vertex in the interference map, and an interference degree between any two slave network nodes is analyzed. the interference degree between two slave network nodes refers to an interference degree when the master network node transmits signals to the two slave network nodes using the same time slot and the same frequency band. In a case that the interference between the two slave network nodes is low, for example, is lower than a predetermined degree, it means that the master network node can communicate with the two slave network nodes using the same time-frequency resources, and there is not edge between two vertexes corresponding to the two slave network nodes in the interference map. On the contrary, in a case that the interference between the two slave network nodes is high, an edge is added between the two vertexes corresponding to the two slave network nodes. The interference map is built after analyzing all of the slave network nodes.

The above interference map is represented as G (V, E), in which, V and E represent a vertex set and an edge set in the interference map, respectively. In a case that may two vertexes in a subset S of the vertex set V are not connected by any edge in the interference map, the subset S is an independent set. An independent set including the maximum master of vertexes is a maximum independent set. As described above, after the slave network nodes are grouped into disjoint independent sets, the master network node may apply the same time-frequency resource block to all of the slave network nodes in one independent set, and avoid interferences by spatial multiplexing based on the beam-forming function.

In an example, the interference degree between two slave network nodes may be determined based on a relative position of each of the slave network nodes with respect to the master network node during the analyzing. For example, in a case that an angle between lines connecting each of the two slave network nodes and the master network node is large, the interference degree is considered to be small. In a case that the angle is small or even is less than a width of a main love of a directional beam, the interference degree is considered to be large. A threshold for the angle may be set based on for example experiences or calculation.

In addition, the interference degree may also be determined by measuring an SINR of a received signal of each of two slave network nodes. For example, it is considered that the interference degree is lower than a predetermined degree in a case that the SNR is greater than a certain threshold.

Alternatively, the interference degree among the drive network nodes may be calculated by the master network node based on a theoretical channel model or antenna model.

In a case that the master network node cannot accurately calculate or estimate the interference degree, a test signal may also be transmitted to two slave network nodes using the same time-frequency resource block, and the interference degree is determined based on an SINR of a received signal of the above network node. The manner may also be regarded as an adjustment to the beam-forming.

After the slave network nodes are grouped as described above, the node cluster may start relay communication. In addition, it should be understood that in a case that a position, a distribution destiny, a link condition or the like of the network node is changed, for example, in a case that an exiting network node goes away from the coverage range of the network control terminal, or a new network node enters into the converge range of the network control terminal, it may be necessary to reselect a master network node, re-perform clustering, or re-perform grouping of the slave network nodes in the node cluster.

It should be understood that in an example that communication between the network control terminal and multiple master network nodes (or a combination of a master network node and a common network node) is performed using the beam-forming, the above grouping unit 303 may be provided in the network control terminal. In a similar manner, the network control terminal groups the multiple master network nodes to determine the master network nodes to which the same time-frequency resources may be allocated, which is not described repeatedly here anymore.

In an example, the first determining unit 301 may be further configured to determine, based on the control signaling, a resource pool which can be used when the present network node operates as a relay node. After the present network node operates as the relay node, for example, the present network node completes the accessing and grouping of the above network nodes, the present network node may directly use resources in the resource pool for relay transmission. For example, in a case that the beam-forming function is activated, the same time-frequency resources may be allocated to all of the slave network nodes in the same group. In addition, spectrum resources may be only allocated to slave network nodes in the maximum independent set, and no spectrum resources are allocated to other slave network nodes in the node cluster. The other slave network nodes may select to access into other master network nodes in next communication.

In practice, the following cases may also exist. For example, since the resources are sufficient or communication reliability requirement is high, the present network node does not activate the beam-forming function, and communicates with the salve network nodes using different time-frequency resources through an omnidirectional antenna.

In another example, the control signaling does not contain information on the resource pool allocated to the master network node, and the network control terminal allocates spectrum resources to the master network node through other signaling. As shown in a dashed line block in FIG. 9, the electronic device 300 may further include a generating unit 304, configured to generate grouping information, to be provided to the network control terminal. The present network node communicates with the slave network node using the spectrum resources allocated by the network control terminal based on the grouping information.

In the example, for example, the second deterring unit 302 may determine, based on, for example, a state of the present network node itself, and a state such as an interference conditions and spectrum resource usage conditions of a communication system, weather to activate the beam-forming function. The determination may be performed before or after grouping. In a case that the determination is performed after the grouping, the grouping conditions may also be taken into consideration in the determination. In an example, the master network node analyzes the size and a state of the interferences based on the received signal, and obtains interference conditions between the present master network node and an adjacent master network node based on communicating with the adjacent master network node, and analyzes whether interferences are reduced significantly in a case of using the directional antenna (that is, in a case of activating the beam-forming function) as compared with in a case of using the omnidirectional antenna, based on the interference conditions. The master network node determines to activate the beam-forming function in a case that the interferences are reduced significantly in a case of using the directional antenna.

The generating unit 304 may correspondingly generate indicating information on whether to activate the beamforming function, to be provided to the network control terminal. The present network node communicates with the slave network nodes using the spectrum resources allocated by the network control terminal based on the indicating information and the grouping information.

Alternatively, it can also be determined by the network control terminal whether to activate the beam-forming function based on the grouping information or the like, and notified the present network node. Similarly, in a case of deterring to activate the beam-forming function, thee network control terminal allocates the same time-frequency resources to all of the slave network nodes in the same group.

In another example, the generating unit 304 is configured to generate information of a request for serving as a relay node to the network control terminal, in a case that it is determined that the present network node is to operate as the relay node. The network control terminal transmits a corresponding notification to the present network node after permitting the request. The second determining unit 302 determines that the present network node is selected as a relay node based on the notification. Subsequently, the present network node may enable accessing and grouping of the slave network nodes, as described above.

Similarly, whether to activate the beam-forming function may be determined by the master network node itself. For example, the second determining unit 302 determines, based on for example a state of the present network node itself, and a state such as interference conditions and spectrum resource usage conditions of the communication system, weather to activate the beam-forming function. Alternatively, weather to activate the beam-forming function may be determined by the network control terminal. The indicating information on whether to activate the beam-forming function may be contained in for example the above notification, or is transmitted by the network control terminal when allocating the spectrum resources based on the provided grouping information or the like. In addition, the above notification may further include an indication of spectrum resources allocated by the network control terminal.

Signaling for transmitting the control signaling and the grouping information which is described in detail in the first embodiment, is also applicable in this embodiment, and is not repeated here anymore.

In summary, the electronic device 300 according to the embodiment may perform spatial multiplexing of spectrum resources using the beam-forming function in a case that the present network node serves as the relay node, thereby improving spectrum utilization efficiency, improving system capacity and communication quality and expanding a communication range.

In addition, communication between the network control terminal and the master network node may also be realized by spatial multiplexing of the same time-frequency resources using the beam-forming function, so that more spectrum resources can be allocated to each master network node.

The first determining unit 301, the second determining unit 302, the grouping unit 303 and the generating unit 304 may be implemented by for example one or more processing circuitries, and the processing circuitry may be implemented as a chip.

<Fourth Embodiment>

Figure 12:
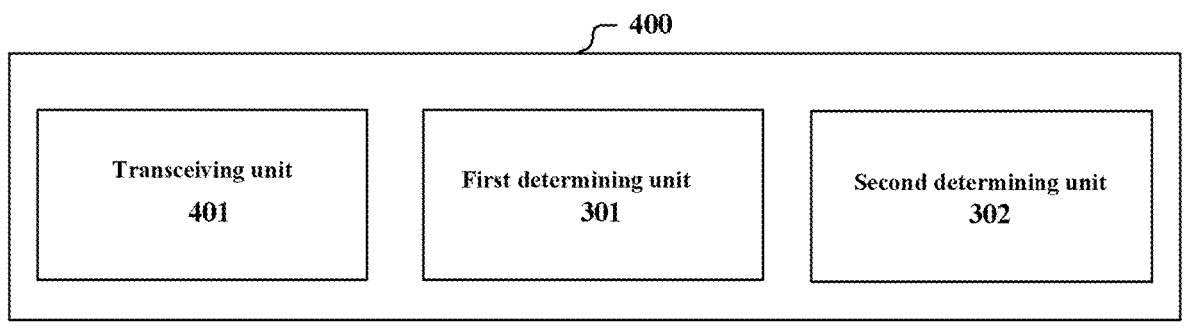
FIG. 12 is a functional block diagram of an information processing device according to another embodiment of the present disclosure.

FIG. 12 is functional block diagram of an information processing device 400 according to another embodiment of the present disclosure. The information processing device 400 includes: a transcribing unit 401, configured to received control signaling from a network control terminal; a first determining unit 301, configured to determine, based on the control signaling, a first condition about beam-forming capability of a network node, and a second determining unit 302, configured to determine, based on the first condition, whether the present network node is to operate as a relay node.

The first determining unit 301 and the second determining unit 392 have the same function and structure as the first determining unit 301 and the second determining unit 302 described in the third embodiment respectively. In addition, although not shown in FIG. 12, the information processing device 400 may further include the grouping unit 303 and the generating unit 304 described in the third embodiment. The description for the first determining unit 301, the second determining unit 302, the grouping unit 303 and the generating unit 304 are already provided in detail in the third embodiment, and is also applicable in this embodiment, which is not repeated here anymore.

In an example, in a case that the present network node operates as a relay node, the transceiving unit 401 is further configured to transmit a pilot signal to other network nodes, receive a connection request from another network node, and transmit a connection response to the network node which is accepted as a slave network node of the present network node, to establish a connection.

In addition, the transceiving unit 401 is further configured to transmit to the network control terminal one or more the of the following information: information a request for serving as a the relay node to the network control terminal; grouping information of slave network nodes; and indicating information on whether to activate the beam-forming function.

In another aspect, the transceiving unit 401 is further configured to receive from the network control terminal one or more of the following information: spectrum resources allocated by the network control terminal; indicating information on whether to activate the beam-forming function; and notification information of being selected as a relay node.

In an example, the transceiving unit 401 may communicate with the network control terminal in a millimeter wave band or a microwave band. The transceiving unit 401 may communicate with the slave network node in a millimeter wave band or a microwave band.

The first determining unit 301, the second determining unit 302, the grouping unit 303 and the generating unit 304 may be implemented by for example one or more processing circuitries, and the processing circuitry may be implemented as for example a chip. the transceiving unit 401 may be implemented as for example multiple antennas (an antenna array). For example, each antenna is connected to phase shifter, and a directional beam is formed by regulating a phase of the phase shifter, to serve the slave network node.

<Fifth Embodiment>

In the process of describing the electronic device and the information processing device in the embodiments described above, obviously, some processing and methods are also disclosed. Hereinafter, an overview of the methods is given without repeating some details disclosed above. However, it should be noted that, although the methods are disclosed in a process of describing the electronic device and the information processing device, the methods do not certainly employ or are not certainly executed by the aforementioned components. For example, the embodiments of the electronic device and the information processing device may be partially or completely implemented with hardware and/or firmware, the method described below may be executed by a computer-executable program completely, although the hardware and/or firmware of the electronic device and the information processing device can also be used in the methods.

Figure 13:
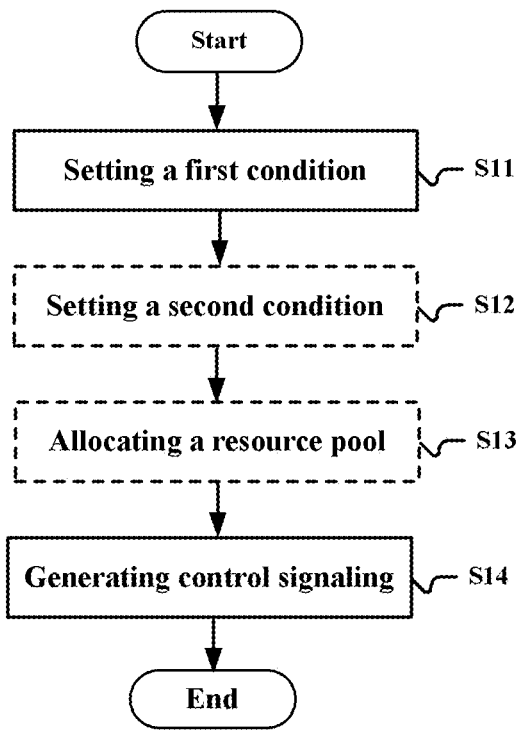
FIG. 13 is a flowchart of a method for an electronic device of a network control terminal according to an embodiment of the present disclosure.

FIG. 13 is a flowchart of a method for an electronic device of a network control terminal according to an embodiment of the present disclosure. The method includes: setting a first condition about bam-forming capability of a network node, to be used for determining a network node which can serve as a relay node (S11); and generating control signaling containing indicating information of the first condition, for instructing network nodes served by the network control terminal (S14).

For example, the first condition includes a threshold for the number of directional beams which can be formed, and/or a threshold for a range of angles of the directional beams.

In addition, as shown in a dashed line block in FIG. 13, the above method may further include: setting a second condition about link quality for the network node, to be used for determining a network node which can serve as a relay nodes (S12); and generating the control signaling further containing indicating information of the second condition in step S14.

In an example, the control signaling further includes information on respective weights of the first condition and the second condition when determining the network node which can serve as the relay node, The weight may be determined by for example based on a spectrum resource state an/or interference conditions of the system.

In step S12, the second condition may be set based on one or more of a distribution density of network nodes, a coverage range of the network control terminal and a target transmission rate of the network node.

In an example the control signaling may further include an additional condition indicating application of the first condition. The additional condition involves for example one or more of the following: the network node with the beam-forming capability permits activating a beam-forming function; electricity amount of the network node with the beam-forming capability is higher than a predetermined threshold; spectrum resources of a system are insufficient; and activating the beam-forming function can reduce overall interferences of the system.

In an example, the above method may further include step S13, allocating a resource pool to the relay node, and incorporating indicating information of the resource pool in the control signaling in step S14.

The control signaling may be broadcast signaling, such as an information element SystemInformationBlockType18 or an information element SystemInformationBlockType19 of a system message based on the improved LTE protocol. Alternatively, the control signaling may be dedicated signaling.

Figure 14:
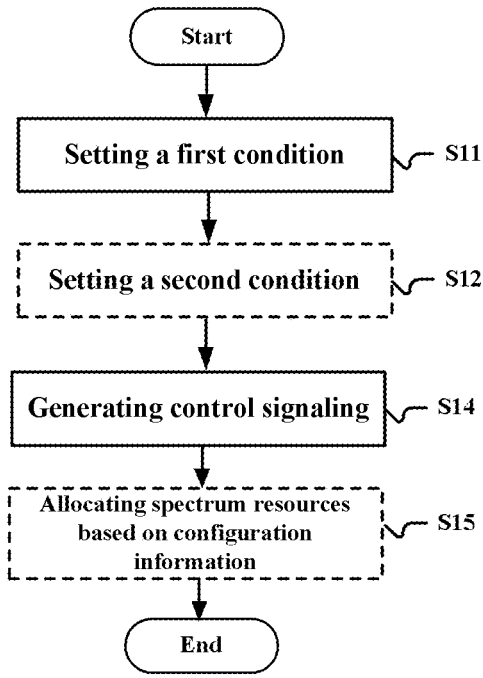
FIG. 14 is a flowchart of a method for an electronic device of a network control terminal according to another embodiment of the present disclosure.

In another example, as shown in FIG. 14, the method may include receiving, by network control terminal, configuration information from a master network node after transmitting the control signaling, rather than step S13. The transfer network node is a network node determined as a relay node. The method includes step S15; allocating spectrum resources to the master network node based on the configuration information. The configuration information includes grouping information of slave network nodes which are to be served by the master network node. The slave network nodes in the same group are subjected to interferences lower than a predetermined degree when using the same time-frequency resources to transmit data in a case of beam-forming.

Furthermore, the configuration information further includes information on whether the master network node is to activate the beam-forming function. Alternatively, it is also possible to set as follows: the network control terminal determines whether to activate the beam-forming function, and notifies the master network node.

Figure 15:
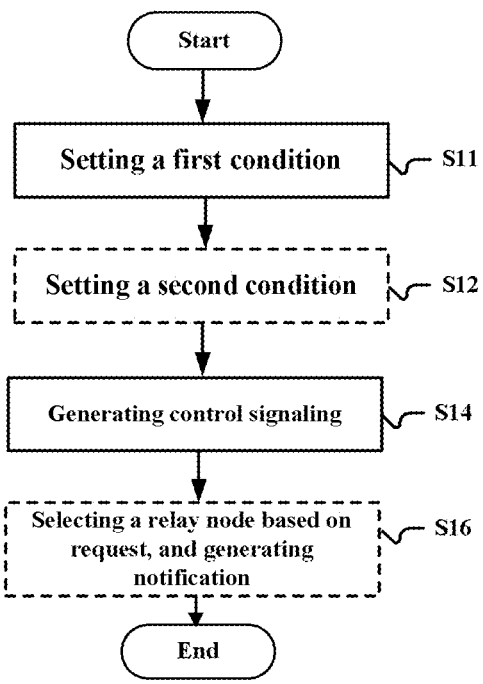
FIG. 15 is a flowchart of a method for an electronic device of network control terminal according to another embodiment of the present disclosure.

In another example, as shown in FIG. 15, the method includes step S15, selecting, based on a request from network node intending to serve as a relay node, the network node as the master network node, and generating a notification for the master network node correspondingly. In other words, whether the network node can operate as the relay node needs to be confirmed by the network control terminal.

The notification may further include spectrum resources allocated to the master network node, and/or the notification may further include indicating information on whether to activate the beam-forming function. Alternatively, the master network node may determine whether to activate the beam-forming function by itself, and the network control terminal allocates spectrum resources to the master network node after the master network node groups the slave network nodes and provides grouping information to the network control terminal.

In the above method, the network control terminal may be for example a base station, and the network node may be for example user equipment or network infrastructure. Communication between the network control terminal and the master network node and communication between the master network node and the slave network node may be performed in microwave band or millimeter wave band.

Figure 16:
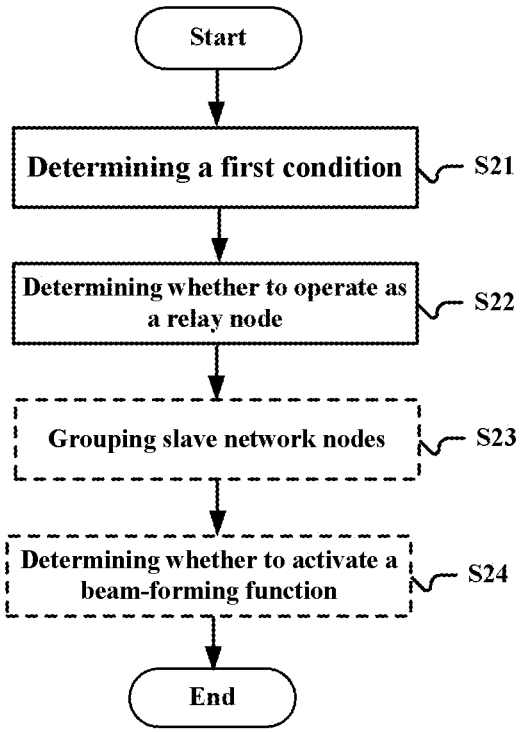
FIG. 16 is a flowchart of a method for an electronic device of a network node according to an embodiment of the present disclosure.

FIG. 16 is a flowchart of a method for an electronic device of a network node according to another embodiment of the present disclosure. The method includes: determining, based on control signaling from the network control terminal, a first condition about beam-forming capability of a network node (S21); determining, based on the first condition, whether the present network node is to operate as the relay node (S22). For example, the first condition includes a threshold for the number of directional beams which can be formed, and/or a threshold for a range of angles of the directional beams.

In addition, step S21 may further include determining a second condition about link quality for a network node based on the control signaling. In step S22, it is determined whether the present network node is to operate as the relay node based on the first condition and the second condition. In step S21, respective weights for the first condition and the second condition may be determined based on the control signaling.

In an example, in step S21, an additional condition indicating application of the first condition may further be determined based on the control signaling. The additional condition can involve one or more of the following: the network node with the beam-forming capability permits activating a beam-forming function, electricity amount of the network node with the beam-forming capability is higher than a predetermined threshold, spectrum resources of a system are insufficient; and activating the beam-forming function can reduce overall interferences of the system.

In step S21, a resource pool which can be used when the present network node operates as the relay node may also be determined based on the control signaling.

As shown in dashed line block in FIG. 16, the method further includes step S23, grouping slave network nodes which access into the present network node after the present network node operates as the relay node. The slave network nodes in the same group are subjected to interferences lower than a predetermined degree when using the same time-frequency resources to transmit data in the case of beam-forming.

The above method further includes step S24: determining whether to activate the beam-forming function, and allocating the same time-frequency resources to the slave network nodes in the same group in a case of determining to activate the beam-forming function. It should be noted that it may determine whether to activate the beam-forming function first, and the slave network nodes are grouped after it determines to activate the beam-forming function.

In an example, grouping information may be generated in step S23 to be provided to the network control terminal, and the master network node communicates with the slave network nodes using the spectrum resources allocated by the network control terminal based on the grouping information.

In addition, in step S24, indicating information on whether to activate the beam-forming function may be generated, to be provided to the network control terminal, and the master network node communicates with the slave network nodes using spectrum resources allocated by the network control terminal based on the indicating information and the grouping information.

In another example, in step S23, information on a request for serving as a relay node to the network control terminal is generated in a case that it is determined that the present network node is to operate as the relay node. The network control terminal determines whether to select the present network node as a relay node based on a state of the present network node, spectrum resource usage conditions of the system or the like, and transmits a notification. The present network node allows the slave network nodes to access in and groups the slave network nodes after receiving the notification for confirmation from the network control terminal. In an example, the notification may further include one or more of spectrum resources allocated by the network control terminal and indicating information on whether the present network node is to activate the beam-forming function.

In an example, in step S23, the slave network nodes are grouped based on an interference map, and the interference map represents interference conditions among slave network nodes when using the same time-frequency resources for communication in the case of beam-forming.

It is to be noted that, the above methods can be used separately or in conjunction with each other. The details have been described in detail in the first to fourth embodiments, and are not repeatedly described here.

For convenience of understanding, several exemplary information flows between a network control terminal and a network node are described below with reference to FIG. 17 to FIG. 22. The network control terminal may include any one of the electronic device 100 or the information processing device 200 described above, or can implement at least a part of functions of the electronic device 100 or the information processing device 200. The network node may include any one of the electronic device 300 or the information processing device 400 described above, or can implement at least a part of functions of the electronic device 300 or the information processing device 400. At least a part of the network node slave beam-forming capability, for example, the network node has multiple antennas. It should be understood that the information flows are only illustrative rather than restrictive.

The network control terminal may be for example a base station such as an eNB. Examples in which the network node is master network node and a slave network node are described respectively. The network node may be for example user equipment (UE) or network infrastructure. It should be understood that the number of network nodes are illustrative rather than restrictive.

Figure 17:
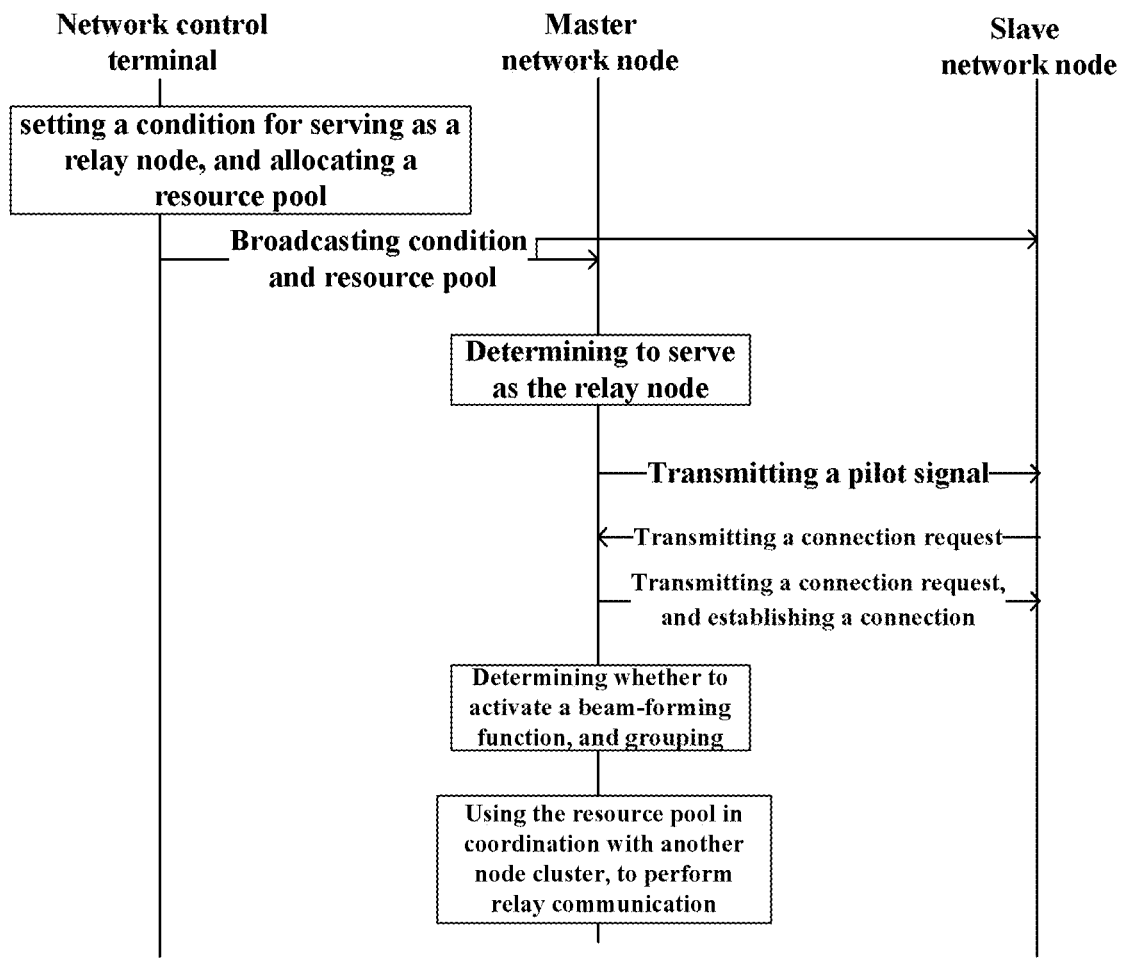
FIG. 17 shows a first exemplary information flow between a network control terminal and a network node.

FIG. 17 is a first exemplary information flow between the network control terminal and the network node. At first, the network control terminal sets a condition which should be satisfied by the network node in order to be capable of serving as a relay node. The condition includes the first condition described above, and may optionally include the second condition, the additional condition indicating application of the first condition or the like. In the example, the network control terminal pre-allocates a resource pool for relay communication which is to be performed by the relay node. That is, the relay node may directly use the time-frequency resources reserved in the resource pool to provide relay service for the slave network nodes of the relay node. Subsequently, the network control terminal broadcasts the set condition and information on the allocated resource pool. A network node in a coverage range of the network control terminal determines whether the present network in a coverage range of the network control terminal determines whether the present network node meets the condition, for example, whether the present network node has beam-forming capability, upon receiving the broadcasted condition, and determines whether to serve as a relay node, that is, a master network node by itself. In a case that it is determined to serve as the master network node, the present network node broadcasts a pilot signal to other network nodes. In this case, the network node which determines to operate as a slave network node receives the pilot signal from the master network node, and calculates a channel state and link quality between the network node and the master network node using channel estimation algorithm. In a case of receiving pilot signals from multiple master network nodes, the slave network node selects to access to a master network node with an optimal channel state and link quality for the link between the network node and the master network node. In practice, any other strategy may be used, which does not affect the implementation of the present disclosure.

Subsequently, the slave network node transmits an access request to the master network node to be accessed, and the master network node transmits a connection response to the slave network node in a case of permitting the access of the slave network node, to establish a connection with the slave network node. In another aspect, in a case of not permitting the access of the slave network node, the master network node may notify the slave network node that the access of the slave network node is not permitted. Alternatively, in a case that the weight of the slave network node overtimes, for example, the slave network node selects a master network node with an optimal channel state and link quality for the link between the network node and the master network node from remaining master network nodes, and transmits a connection request. In this way, all of the network nodes are grouped into multiple master and slave network node clusters (abbreviated as node cluster). Each of the node clusters includes one master network node and one or more slave network nodes.

The master network node determines whether to activate the beam-forming function based on for example a density of network nodes, a communication requirement, interference conditions, a spectrum resource state and conditions of the master network node. Alternatively, the master network node activates the beam-forming function by default.

In order to implement spatial multiplexing of the spectrum resources using the beam-forming function, the master network node further groups the slave network nodes which access thereto, to obtain an independent set of slave network nodes which are subjected to mutual interferences lower than a predetermined degree when using the same time-frequency resources to transmit data. The grouping may be performed based on for example an interference map. After obtaining several disjoint independent sets. the master network node allocates the same time-frequency resources in the resource pool to the slave network nodes in each of the independent sets. In addition, since there may be multiple node clusters simultaneously using spectrum resources in the resource pool, a coordination operation among the node clusters is required, to reduce mutual interferences among the node clusters.

Figure 18:
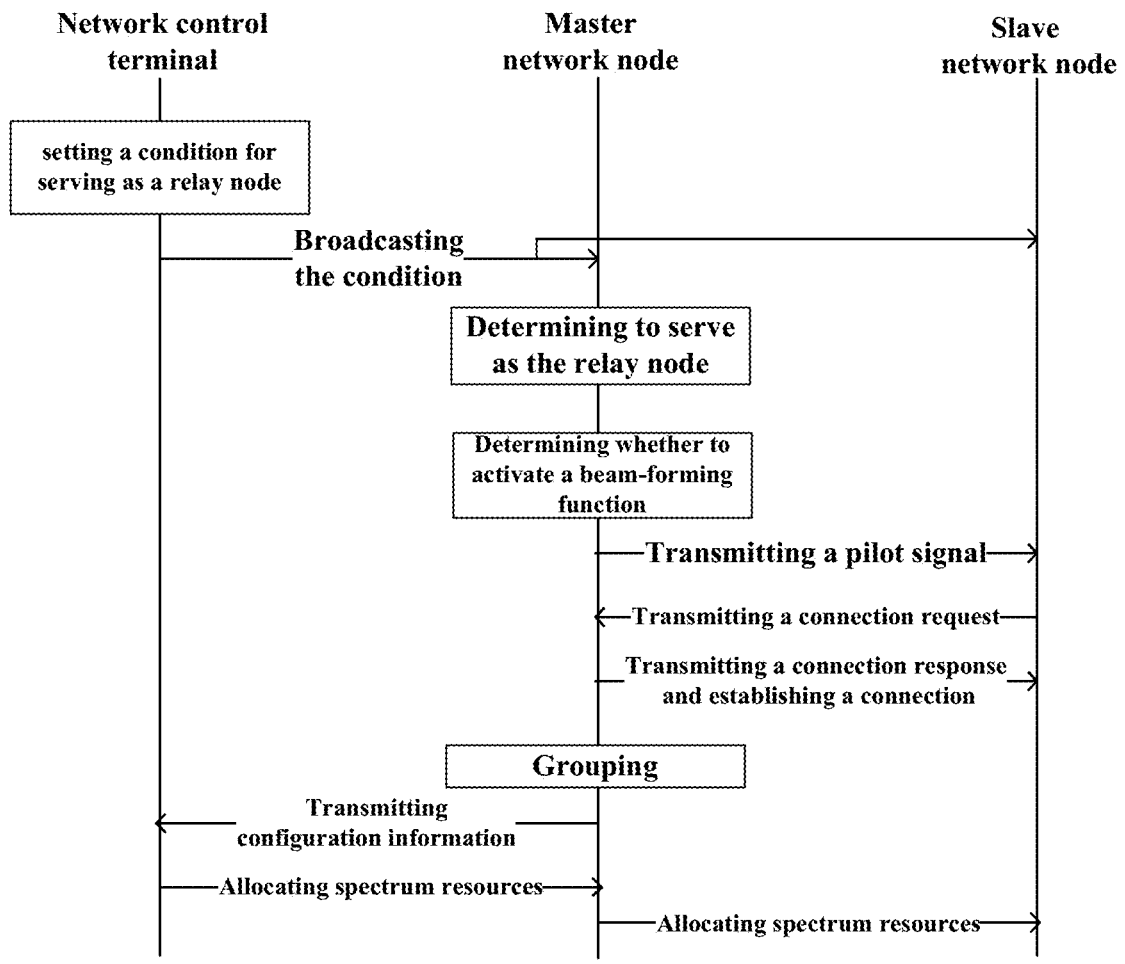
FIG. 18 shows a second exemplary information flow between a network control terminal and network node.

FIG. 18 shows a second exemplary information flow between the network control terminal and the network node. The second exemplary information flow is distinguished from the first exemplary information flow described with reference to FIG. 17 in that the network control terminal allocates spectrum resources to the master network node after the master network node groups the slave network nodes.

In FIG. 18 the master network node determined to serve as the relay node determines whether to activate the beam-forming capability based on a state of the master network node itself, interference conditions, a spectrum usage state of a system or the like. Subsequently, the master network node broadcasts a pilot signal, and receives a connection request from the slave network node and transmits a connection response to establish a connection. Subsequently, in a case of determining to activate the beam-forming function, the master network node groups the second slave network nodes based on for example an interference map, and transmits grouping information and indicating information on whether to activate the beam-forming function to the network control terminal. The network control terminal allocates resources to the master network node based on the grouping information and the indicating information described above. As described above, the allocated spectrum resources may include spectrum resources to be used for relay communication between the master network node and the slave network node, and spectrum resources to be used for communication between the master network node and the network control terminal. Alternatively, the same spectrum resources can be used for the two aspects of communications. Next, the master network node allocates the resources allocated by the network control terminal to its slave network nodes, for relay communication.

Figure 19:
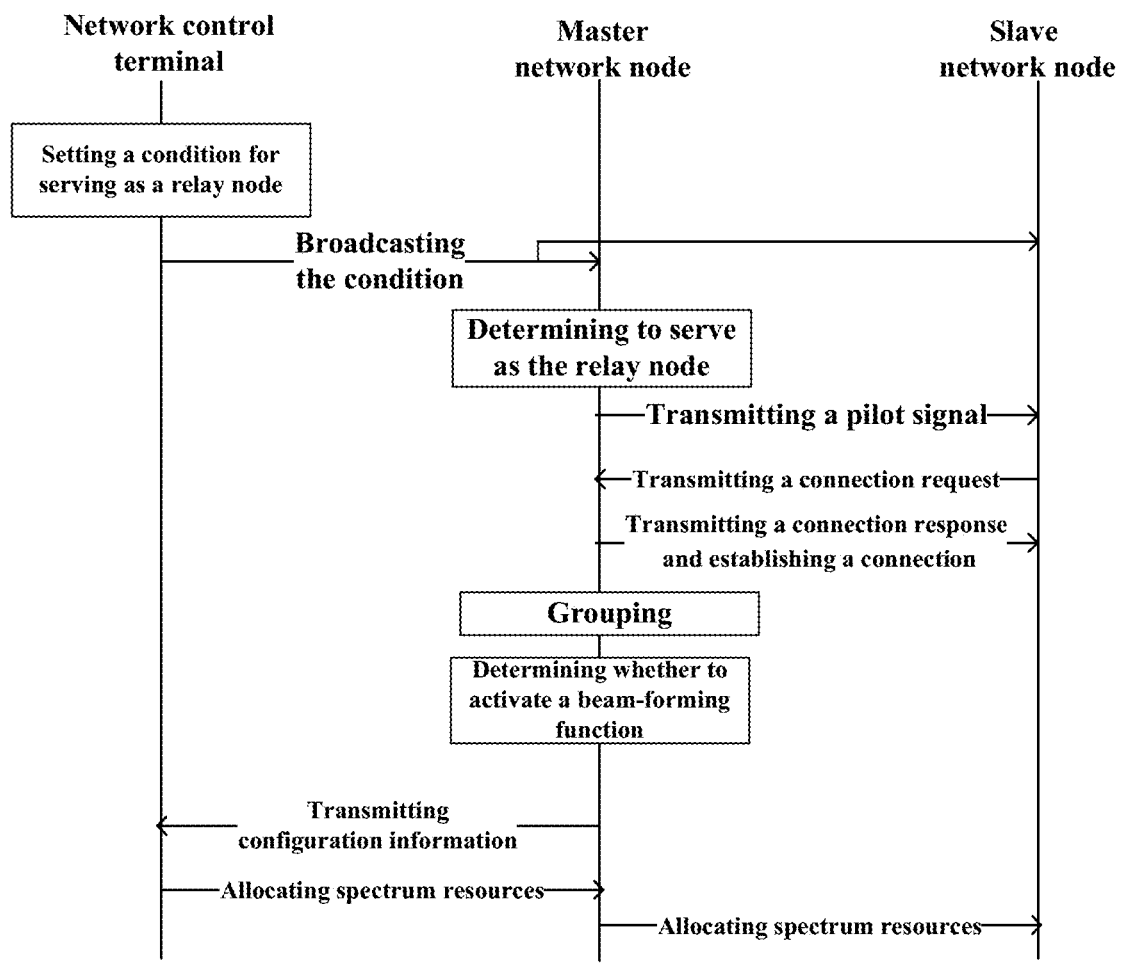
FIG. 19 shows a third exemplary information flow between a network control terminal and a network node.

FIG. 19 shows a third exemplary information flow between a network control terminal and a network node. The third exemplary information flow is distinguished from the second exemplary information flow described with reference to FIG. 18 in a time when to determine whether to activate the beam-forming function.

In FIG. 19, the master network node determines whether to activate the beam-forming function after the completion of accessing and grouping of the slave network nodes. In this case, the grouping information is also taken into consideration in determining whether to activate the beam-forming function. Subsequently, the master network node transmits the grouping information and indicating information on whether to activate the beam-forming function to the network control terminal. The network control terminal allocates resources to the master network node based on the grouping information and the indicating information. next, the master network node allocates the resources allocated by the network control terminal to its slave network nodes for relay communication.

Figure 20:
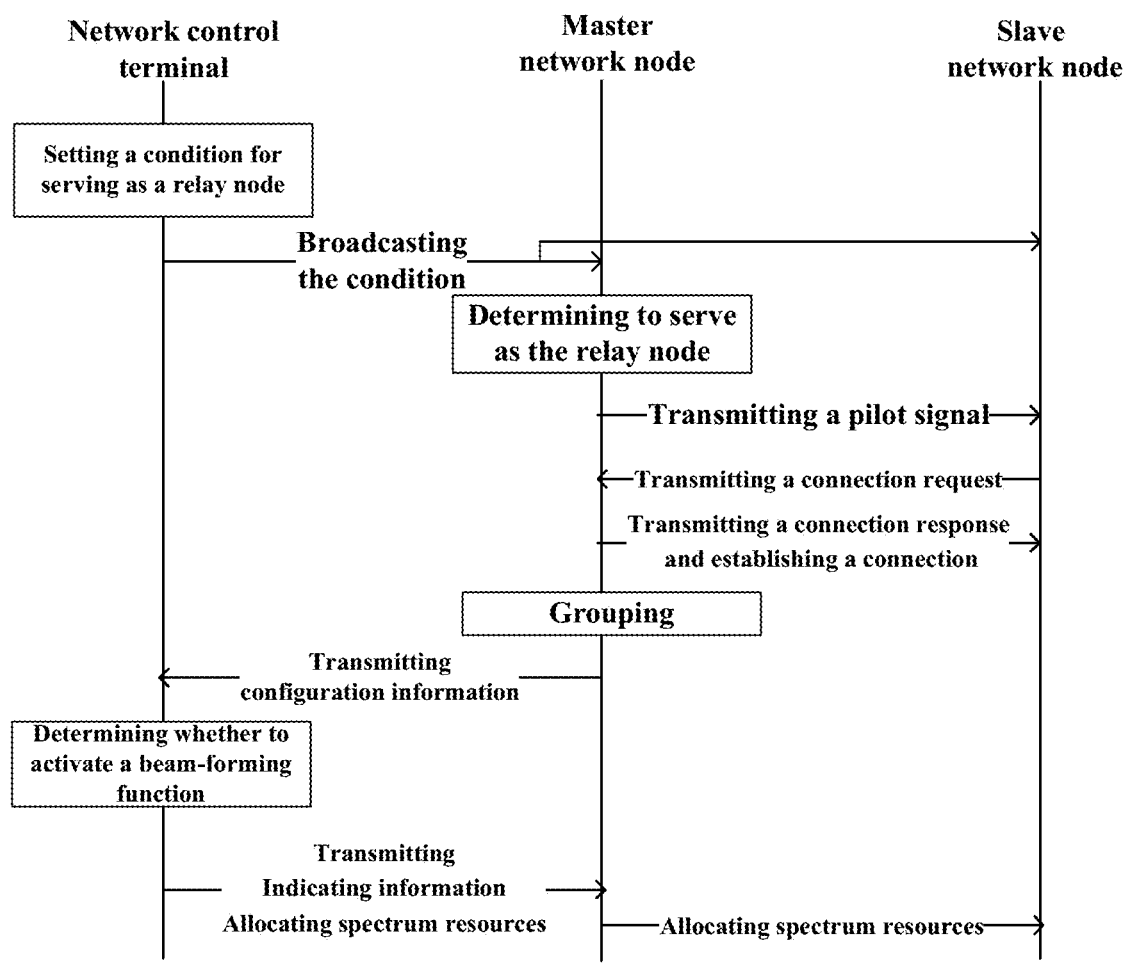
FIG. 20 shows a variation of the third exemplary information flow.

In addition, FIG. 20 shows a variation of the third exemplary information flow. In the variation, the master network node provides the grouping information to the network control terminal, without determining whether to activate the beam-forming function, after completion of accessing and grouping of the slave network nodes. The network control terminal determines whether to activate the beam-forming function based on the grouping information and other system information such as an interference conditions, spectrum resource usage conditions or the like, and transmits the corresponding indicating information to the master network node. In addition, the network control terminal allocates resources to the master network node correspondingly Next, the master network node allocates the resources allocated by the network control terminal to its slave network nodes for relay communication.

Figure 21:
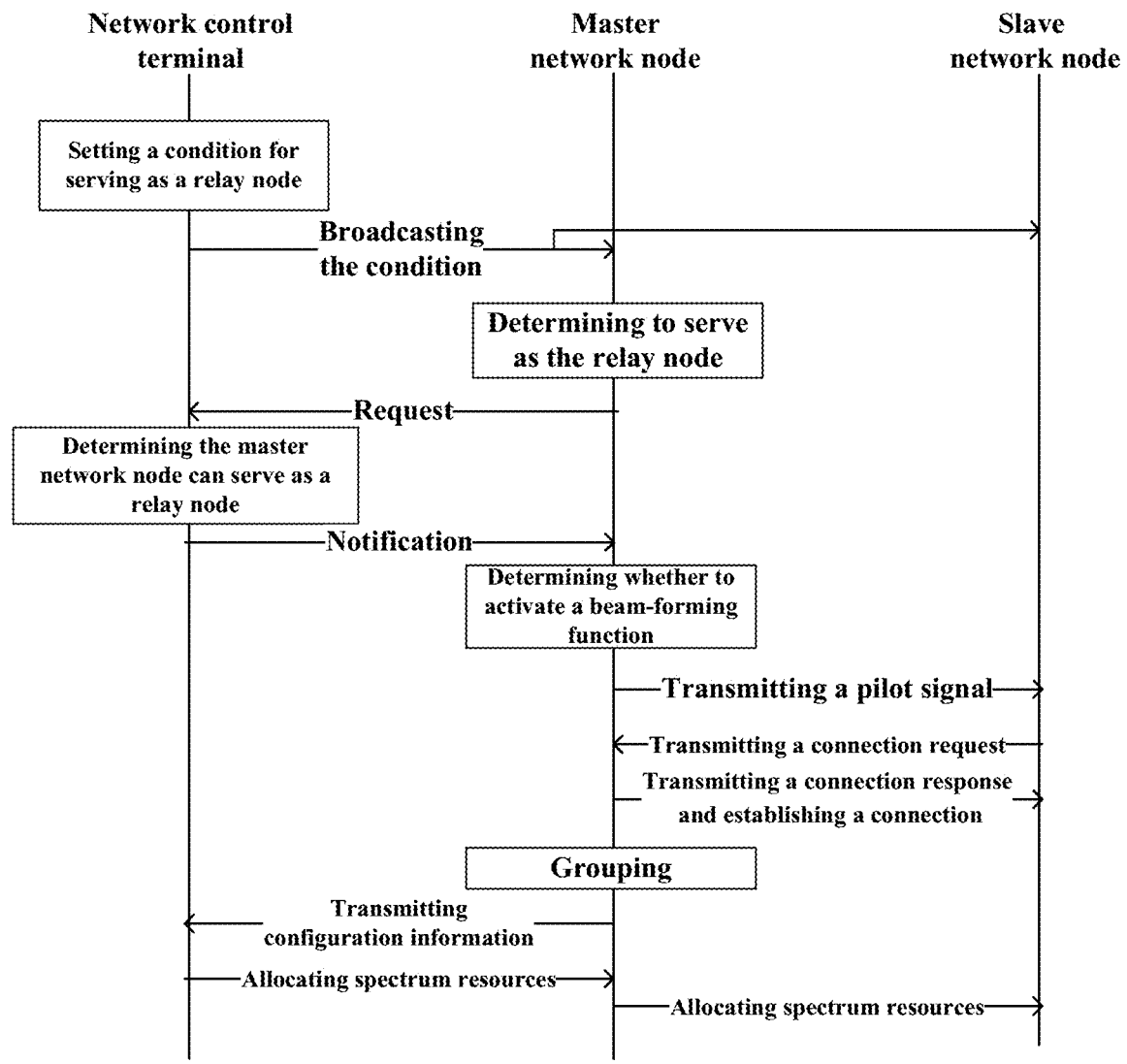
FIG. 21 shows a fourth exemplary information flow between a network control terminal and a network node.

FIG. 21 shows a fourth exemplary information flow between a network control terminal and a network node. The fourth exemplary information flow is distinguished from the first to third exemplary information flow in that whether the network node can serve as the relay node requires to be further determined by the network control terminal.

In FIG. 21, a network node which determines to serve as a relay node transmits information on a request for serving as a relay node to the network control terminal. The information on the request may further include for example information about beam-forming capability of the network node. The network control terminal determines whether the network node can serve as a relay node based on the information on the request, and transmits a notification to the network node. In a case that the network control terminal permits the network node to serve as the relay node, the network node may determine whether to activate the beam-forming function, perform the accessing and grouping of the slave network nodes, and use the spectrum resources allocated by the network control terminal for relay communication, in a similar way to FIG. 18. also, the network node may determine whether to activate the beam-forming function after the grouping (not shown in FIG. 21), in a similar way to FIG. 19. Since a detailed flow is substantially the same to the flows shown in FIG. 18 and FIG. 19, which is not repeated here anymore.

In addition, in FIG. 21, the network control terminal may also allocate spectrum resources to the network node when transmitting a notification to he network node that the network node can operate as the relay node. In this case, the operation of transmitting configuration information to the network control terminal after the grouping and the operation of allocating spectrum resources by the network control terminal are not required.

Figure 22:
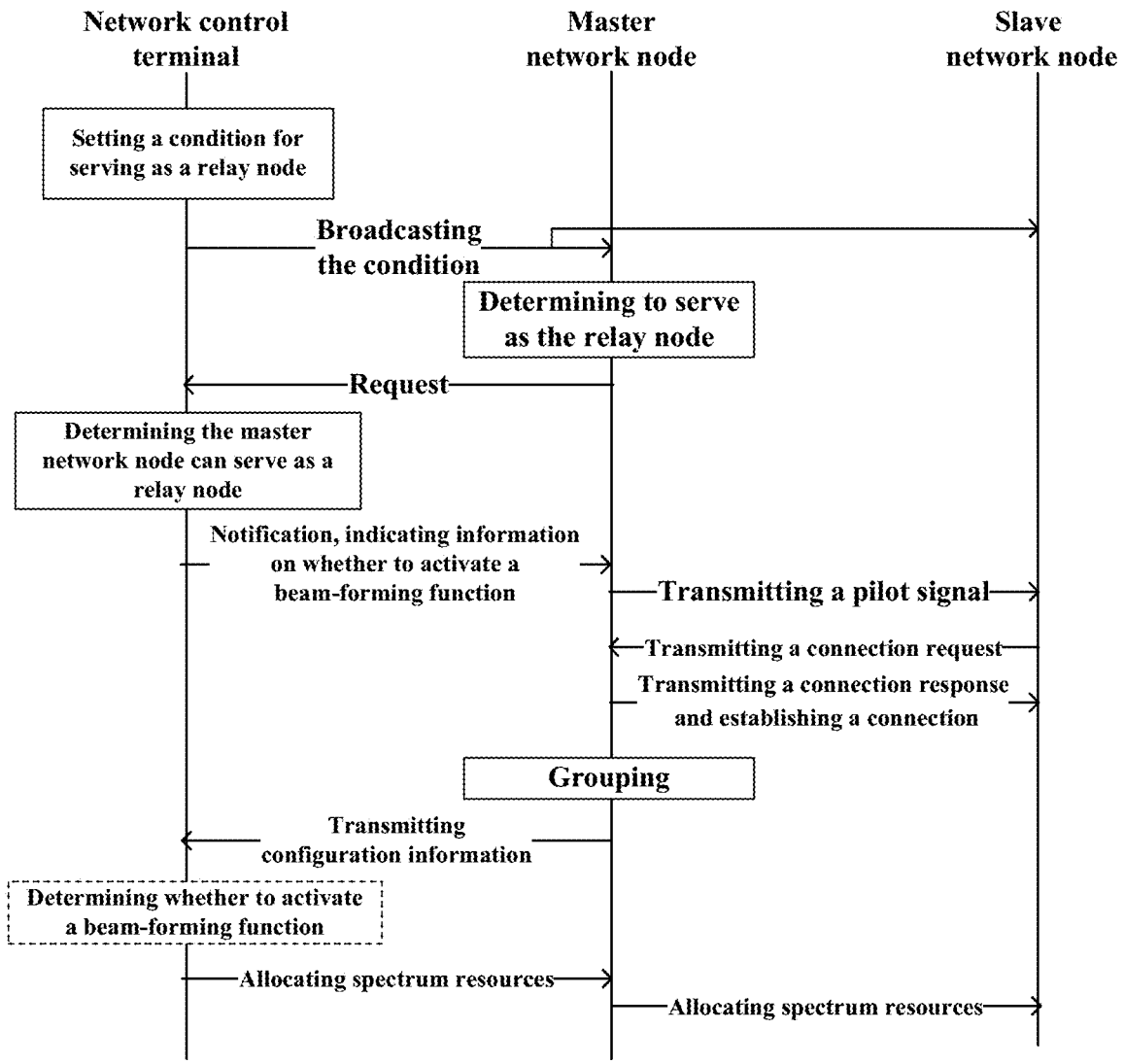
FIG. 22 shows a variation of the fourth exemplary information flow.

FIG. 22 shows a variation of the fourth exemplary information flow. In the variation, the network control terminal transmits indicating information on whether to activate the beam-forming function along with the notification that the network node can operate as the relay node to the network node. In other words, the network control terminal determines whether to activate the beam-forming function based on related information of the system.

In addition, alternatively, as shown in a dashed line block in FIG. 22, the network control terminal determines whether to activate the beam-forming function, after the slave network nodes accessing to the master network nodes and are grouped and the grouping information is reported to the network control terminal, similar to the flow shown in FIG. 20. Next, the network control terminal notifies the master network node of indicating information on whether to activate the beam-forming function and allocated spectrum resources.

In summary, the electrode device, the information processing device and the method in the present disclosure can implement one-to-many relay using beam-forming function of the network node, to implement signal multiplexing of spectrum resources, thereby increasing system capacity and communication quality.

In addition, although the technology is described above with respect to a scenario of relay communication, it should be understood by those skilled in the art that the above description is only exemplary embodiments, and the technology is not limited thereto. Instead, the technology may be applied to various other scenarios of communication, for example, a scenario of communication between a master node and multiple slave nodes other than the relay communication Prose communication, such as a scenario of a normal D2D communication or V2V communications. In the scenarios, a node with beam-forming capability may be preferably selected as a master node in a similar manner described in the above relay communication example, to efficiently perform communication of a control message such as resource scheduling, interference cancellation with the slave nodes. Also, reasonable variations and changes may be made by those skilled in the art based on technical content in the present disclosure, and the variations and changes full within the scope of the present disclosure.

<Application Examples>

The technology of the present disclosure is applicable to various products. For example, the above mentioned base station may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications, and one or more remote radio heads (RRHs) arranged in a different position from the body. In addition, various types of user equipments, which will be described below, may each operate as the base station by temporarily or semi-persistently executing a base station function.

[Application Example Regarding Base Station]

( First Application Example)

Figure 23:
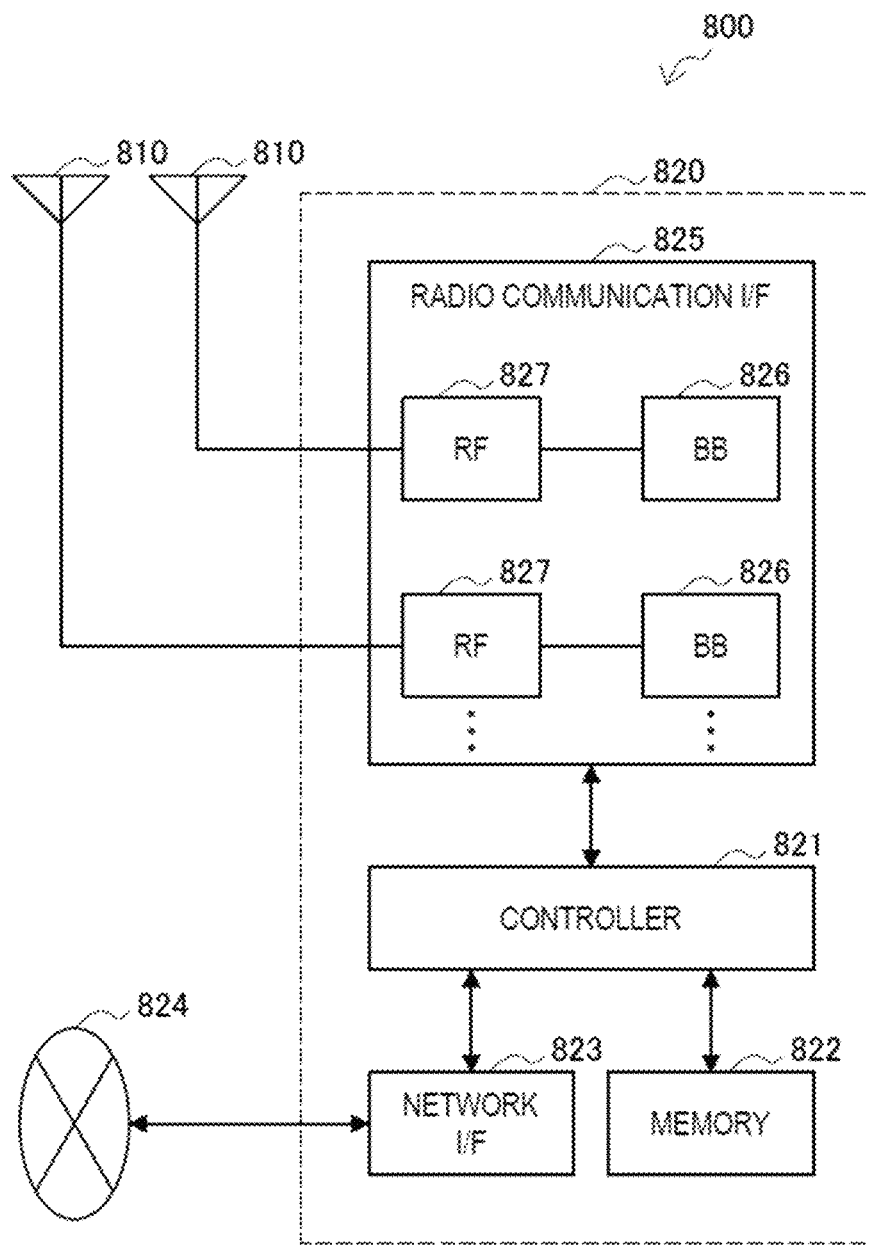
FIG. 23 is a block diagram illustrating a first example of a schematic configuration of an evolved Node B (eNB) to which the technology of the present disclosure may be applied.

FIG. 23 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 920 to transmit and receive radio signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station apparatus 920 includes a controller 821, a memory 922, a network interface 923, and radio communication interface 825.

The controller 821 may be, for example, a CPU or a DSP, and operates various functions of a higher layer of the base station apparatus 820. For example, the controller 821 generates a data packet from data in signals processed by the radio communications interface 825, and transfers the generated packet via the network interface 823. The controller 821 may bundle data from multiple base band processors to generate the bundled packet, and transfer the generated bundled packet. The controller 821 may have logical conations of performing control such as radio resource control, radio bearer control, mobility management, admission control, and scheduling. The control may be performed in corporation with an eNB or a core network node in the vicinity. The memory 922 includes a RAM and a ROM, and stores a program that is executed by the controller 921 and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme (such as Long Term Evolution (LTE) and LTE-Advanced), and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that as mounted on the card or the blade. Meanwhile, the RF circuit 826 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RF circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 23, the transcribing unit 201 described with reference to FIG. 9 may be implemented by the radio communication interface 825. At least a part of the functions may also be implemented by the controller 821. For example, the controller 821 can impalement setting of a condition which the relay node should meet and generation of corresponding control signaling by implementing the function of the setting unit 101 and the generating unit 102.

(Second Application Example)

Figure 24:
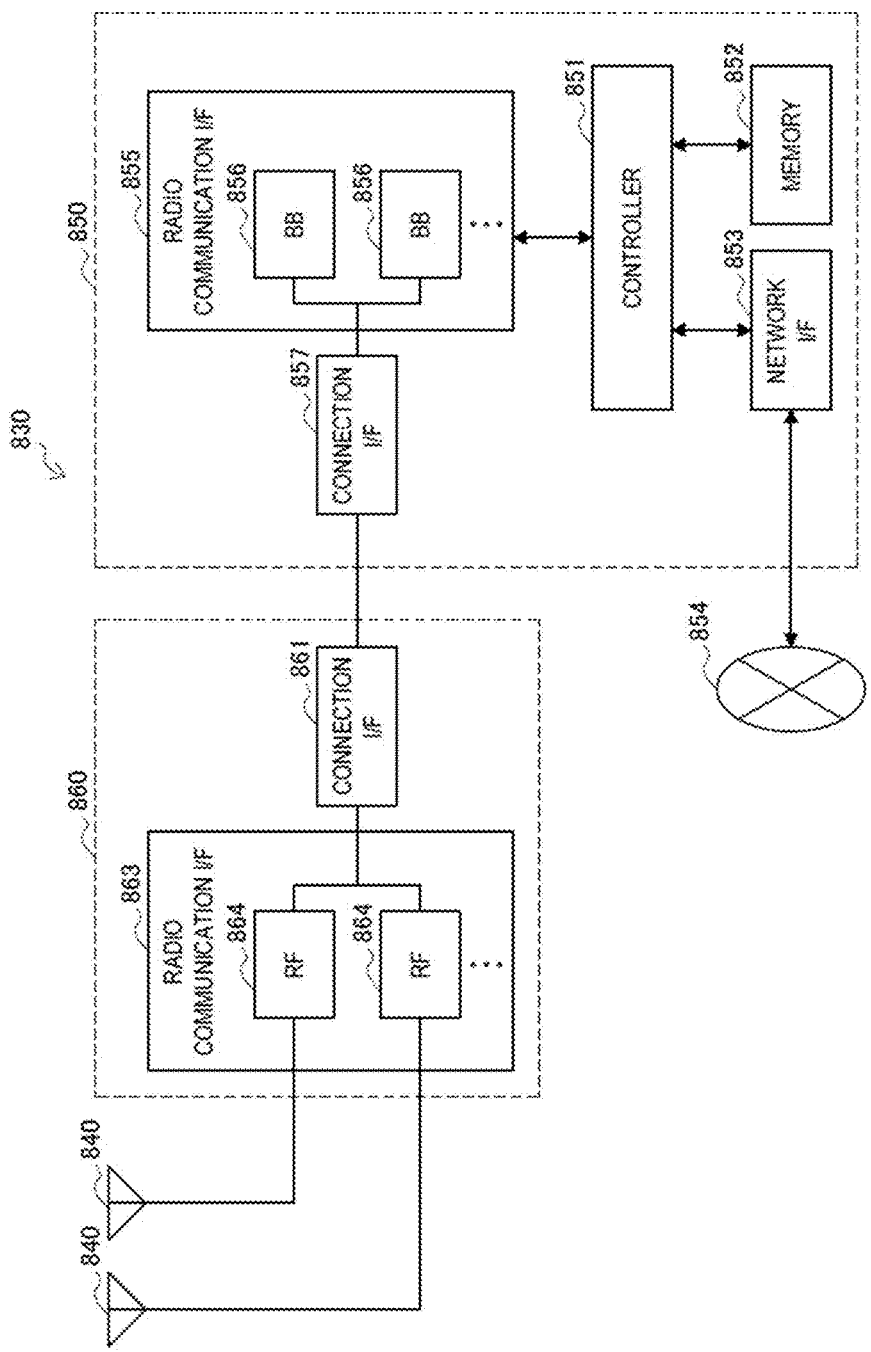
FIG. 24 is a block diagram illustrating a second example of a schematic configuration of an eNB to which the technology of the present disclosure may be applied.

FIG. 24 is a block diagram illustrating a second example of a schematic configuration of an eNB to which the technology of the present disclosure may be applied. An eNB 830 includes one or more antennas 940, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station apparatus 850 includes a controller 851, a memory 852, a network interface 853, a radio communication interface 835, and a connection interface 857. The controller 851, the memory 852, and the network interface 855 are the same as the controller 821, the memory 822, and the network interface 823 described with reference to FIG. 24.

The radio communication interface 855 supports any cellular communication scheme (such as LTE and LTE-Advanced), and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 processor described with reference to FIG. 24, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrate din FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 830 illustrated in FIG. 24, the transcribing unit 201 described with reference to FIG. 8 may be implemented by the radio communication interface 855 and/or the radio communication interface 863. At least a part of the functions may also be implemented by the controller 851. For example, the controller 851 can implement setting of a condition which the relay node should meet and generation of corresponding control signaling by implementing the function of the setting unit 101 and the generating unit 102.

[Application Examples Regarding User Equipment]

(First Application Example)

Figure 25:
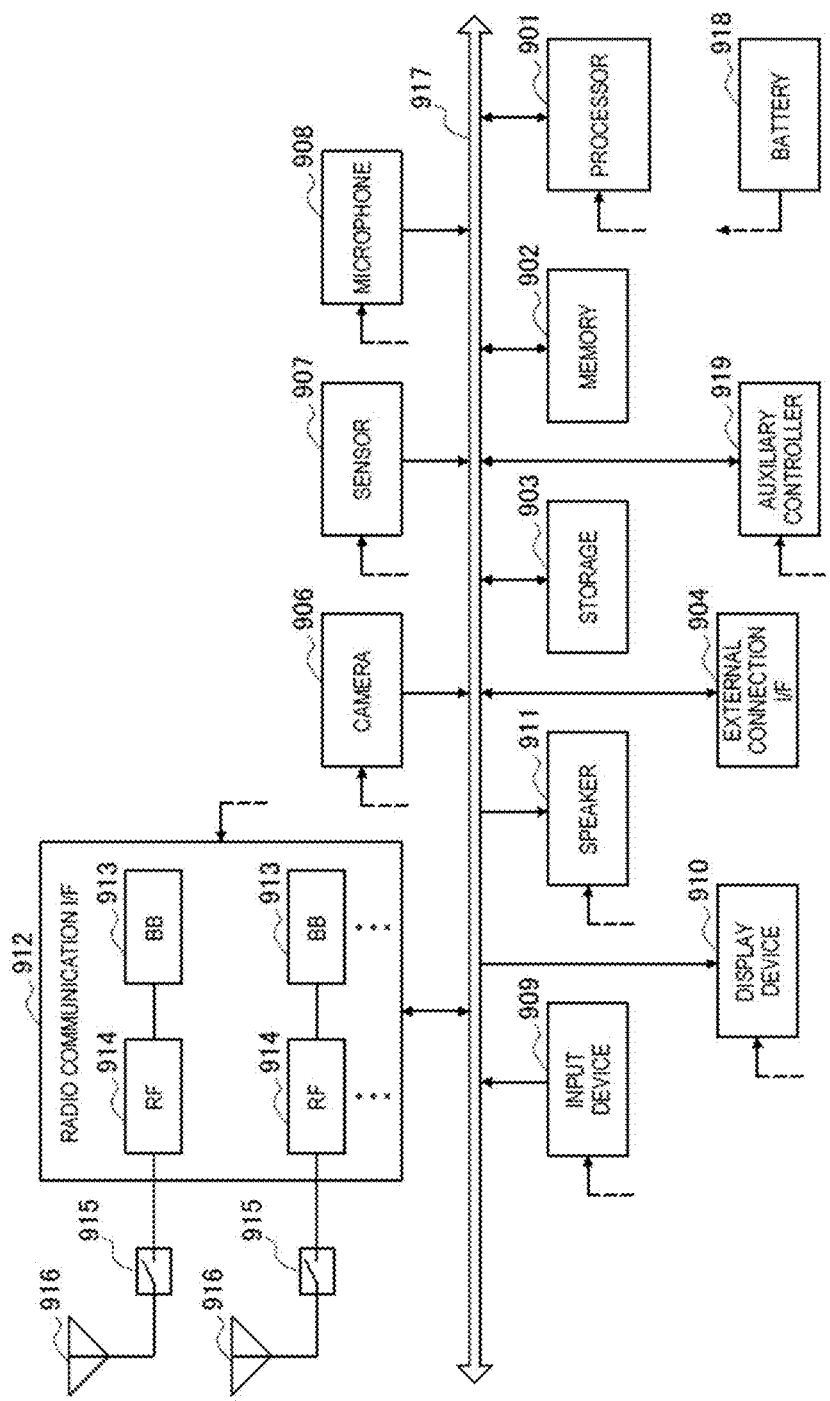
FIG. 25 is a block diagram illustrating an example of a schematic configuration of a smart phone to which the technology of the present disclosure may be applied.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors such as a measurement sensor, a gyro sensor, a geomagnetic sensor, and a acceleration sensor. The microphone 908 converts sounds that are input to the smartphone 900 to audio signals. The input device 900 includes, for example, a touch sensor configured to detect touch onto a screen of the display device 910, a keypad, a keyboard, a button, or a switch, and receives an operation or an information input from a user. The display device 910 includes a screen (such as a liquid crystal display (LCD) and an organic light-emitting diode (OLED) display), and displays an output image of the smartphone 900. The speaker 911 converts audio signals that are output from the smartphone 900 to sounds.

The radio communication interface 912 supports any cellular communication scheme such as LET and LTE-Advanced), and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 25. Although FIG. 25 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 903 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements include din an MIMO antenna), and is used for the radio communication interface 912 to transmit and receive radio signals. Although not shown in FIG. 25, in a case that the antenna 916 includes multiple antenna elements, RF links may be connected with multiple antenna elements through multiple phase shifters, respectively. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the FIG. 25. The auxiliary controller 919 operates a minimum necessary function of the smartphone 900, for example, in a sleep mode.

In the smartphone 900 illustrated in FIG. 25, the transcribing unit 401 described with reference to FIG. 12 may be implemented by the radio communication interface 912. At least a part of the functions may also be implemented by the processor 901 or the auxiliary controller 919. For example, the processor 901 or the auxiliary controller 919 can determine whether the present network node is to operate as a relay node by implementing the function of the first determining unit 301, the second determining unit 302, the grouping unit 303 and the generating unit 304.

(Second Application Example)

Figure 26:
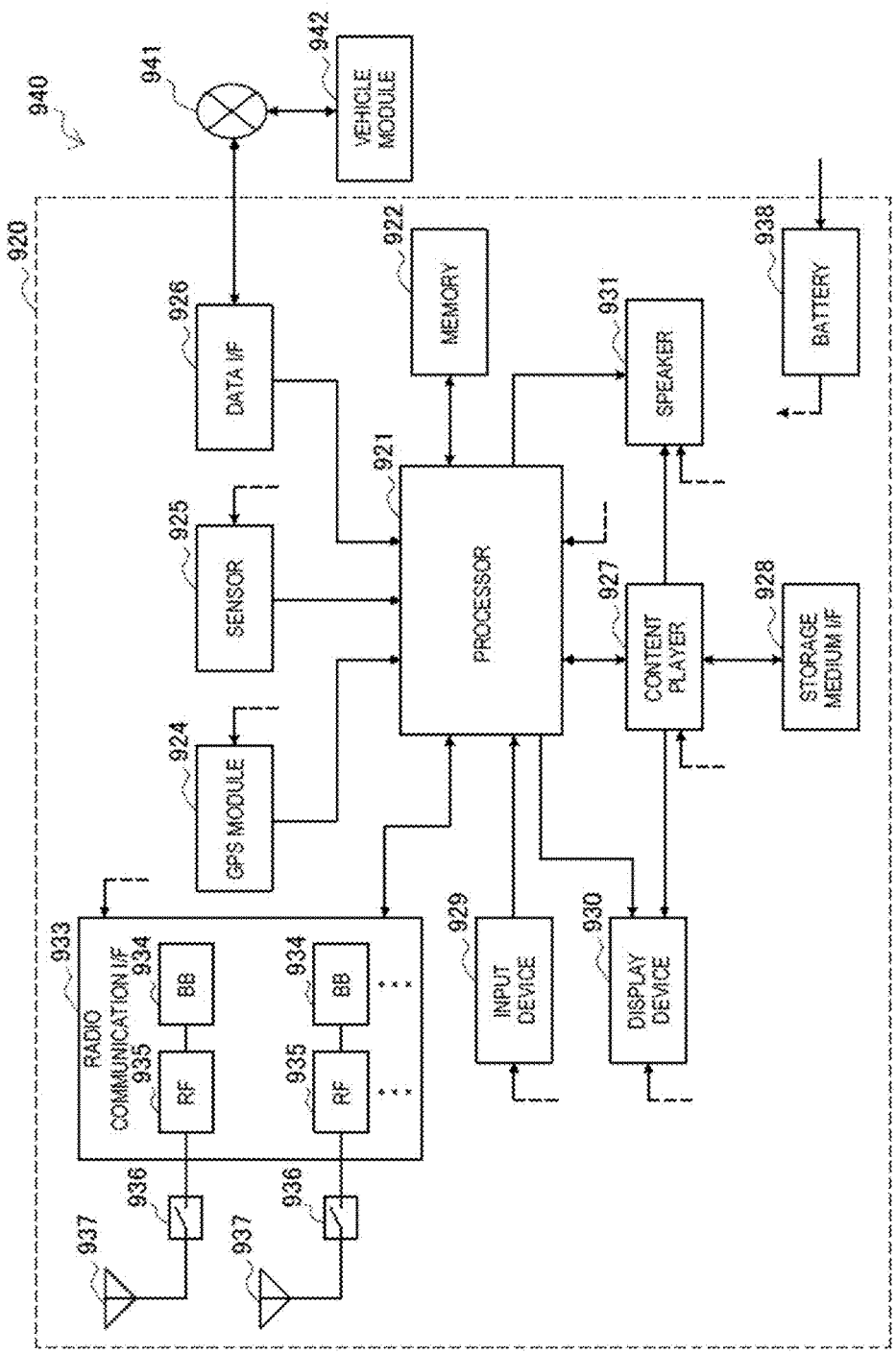
FIG. 26 is a block diagram illustrating an example of a schematic configuration of a car navigation device to which the technology of the present disclosure may be applied.

FIG. 26 is a block diagram illustrating an example of a schematic configuration of a car navigation apparatus 920 to which the technology of the present disclosure may be applied. The car navigation apparatus 920 includes a processor 921, memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921 and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports ay cellular communication scheme (such as LTE and LTE-Advanced), and performs radio communication. The radio communication interface 933 may typically include, for example, a B processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 26. Although FIG. 26 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements include din an MIMO antenna), and is used for the radio communication interface 933 to transmit and receive radio signals. The car navigation apparatus 920 may include the multiple antennas 937, as illustrate din FIG. 26. Although FIG. 26 illustrates the example in which the car navigation apparatus 920 includes the multiple antennas 937, the car navigation apparatus 920 may include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 26 via feeder lines that are partially shown as dashed lines in the IF. 26. The battery 938 accumulates power supplied from the vehicle.

In the car navigation apparatus 920 illustrated in FIG. 26, the transcribing unit 401 described with reference to FIG. 12 may be implemented by the radio communication interface 933. At least a part of the functions may also be implemented by the processor 921. For example, the processor 921 can determine whether the present network node is to operate as a relay node by implementing the function of the first determining unit 301, the second determining unit 202, the grouping unit 303 and the generating unit 304.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data (such as vehicle speed, engine speed, and trouble information), and outputs the generated data to the in-vehicle network 941.

The basic principle of the present disclosure has been described above in conjunction with particular embodiments. However, as can be appreciated by those ordinarily skilled in the art, all or any of the steps or compounds of the method and apparatus according to the disclosure can e implemented with hardware, firmware, software of a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2700 shown in FIG. 27) from a stooge medium or network, wherein the computer is capable of implementing various functions when installed with various programs.

Figure 27:
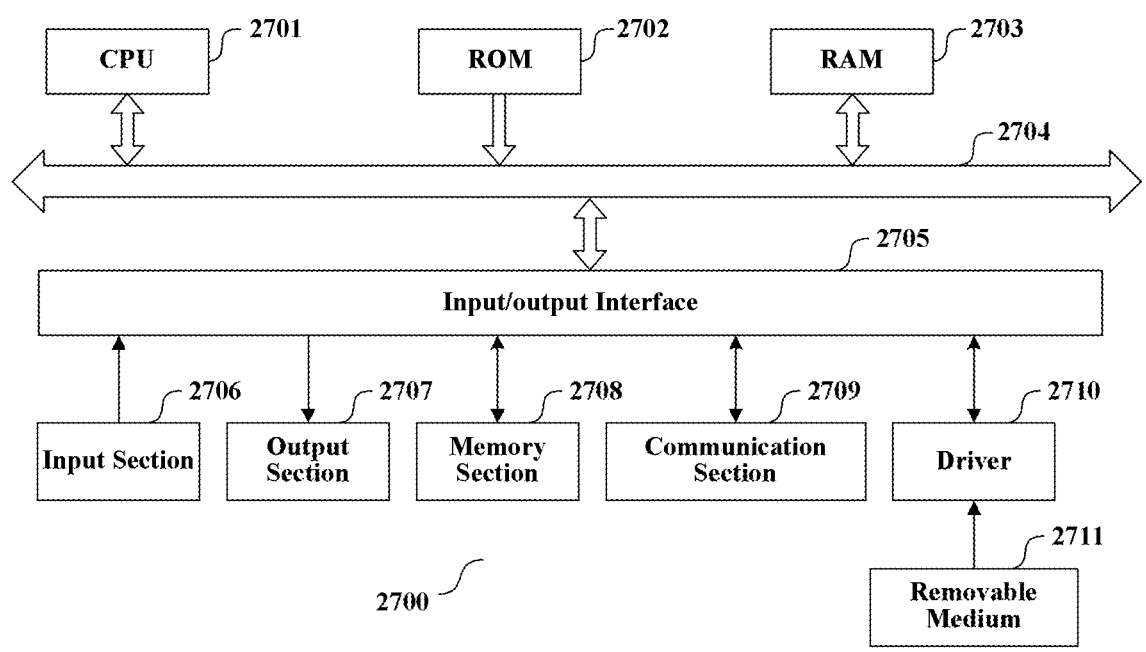
FIG. 27 is a block diagram of an exemplary block diagram illustrating the structure of a general purpose personal computer capable of realizing the method and/or device and/or system according to the embodiments of the present invention.

In FIG. 27, a central processing unit (CPU) 2701 executes various processing according to a program stored in a read-only memory (ROM) 2702 or a program loaded to a random access memory (RAM) 2703 from a memory section 2708. The data needed for the various processing of the CPU 2701 may be stored in the RAM 2703 as needed. The CPU 2701, the ROM 2702, and the RAM 27003 are linked with each other via a bus 2704. An input/output interface 2705 is also linked to he bus 2704.

The following components are linked to the input/output interface 2705: an input section 2706 (including keyboard, mouse and the like), an output section 2707 (including displays such as a cathode ray tube (CRT), a liquid crystal display (LCD), a loudspeaker and the like), a memory section 2708 (including hard disc and the like), and a communication section 2709 (including network interface card such as a LAN card, modem and the like). The communication section 2709 performs communication processing via a network such as the Internet. A driver 2710 may also be linked to the input/output interface 2705, if needed, if needed, a removable medium 2711, for example, a magnetic disc, an optical disc, a magnetic optical disc, a semiconductor memory and the like, may be installed in the driver 2710, so that the computer program read therefrom is installed in the memory section 2708 as appropriate.

In the case where the foregoing series of processing is achieved through software, programs forming the software are installed from a network such as the Internet or a memory medium such as the removable medium 2711.

It should be appreciated by those skilled in the art that the memory medium is not limited to the removable medium 2711 shown in FIG. 27, which has program stored therein and is distributed separately from the apparatus so as to provide the programs to users. The removable medium 2711 may be, for example, a magnetic disc (including floppy disc (registered trademark)), a compact disc (including compact disc read-only memory (CD-ROM)), and digital versatile disc (DVD), a magneto optical disc (including mini disc (MD) (registered trademark)), and a semiconductor memory. Alternatively, the memory medium may be the hard discs include din ROM 2702 and the memory section 2708 in which programs are stored, and can be distributed to users along with the device in which they are incorporated.

To be further noted, in the apparatus, method and system according to the present disclosure, the respective components or steps can e decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device for a network control terminal, comprising processing circuitry configured to:
    set a first condition about beam-forming capability of a network node, to be used for determining a network node which is capable of serving as a relay node, the first condition comprising a threshold for the number of directional beams that can be formed and/or a threshold for a range of angles of the directional beams;
    generate control signaling containing indicating information of the first condition, for instructing network nodes served by the network control terminal; and
    transmit the control signaling to the network node so that the network node determines whether the network node is to operate as the relay node based on the first condition.

2. The electronic device according to claim 1, wherein the processing circuitry is further configured to set a second condition about link quality for the network node, to be used for determining a network node which is capable of serving as a relay node, and generate the control signaling further containing indicating information of the second condition.

3. The electronic device according to claim 2, wherein the processing circuitry is configured to set the second condition according to one or more of the following:
    a distribution density of the network nodes, a coverage range of the network control terminal, and a target transmission rate of the network node.

4. An electronic device for a network node, comprising processing circuitry configured to:
    determine, based on control signaling transmitted from a network control terminal, a first condition about beam-forming capability of the network node, the control signaling being generated at the network control terminal for instructing network nodes served by the network control terminal, and the first condition comprising a threshold for the number of directional beams that can be formed and/or a threshold for a range of angles of the directional beams; and
    determine, based on the first condition, whether the present network node is to operate as a relay node.

5. The electronic device according to claim 4, wherein the processing circuitry is further configured to determine, based on the control signaling, a second condition about link quality for the network node, and determine, based on the first condition and the second condition, whether the present network node is to operate as the relay node.

6. The electronic device according to claim 5, wherein the processing circuitry is further configured to determine, based on the control signaling, respective weights for the first condition and the second condition.

7. The electronic device according to claim 4, wherein the processing circuitry is further configured to determine, based on the control signaling, an additional condition indicating application of the first condition,
    wherein the additional condition involves one or more of the following: the network node with the beam-forming capability permits activating a beam-forming function; amount of power of the network node with the beam-forming capability is higher than a predetermined threshold; spectrum resources of a system are not sufficient; activating the beam-forming function is capable of reducing overall interferences of the system.

8. The electronic device according to claim 4, wherein the processing circuitry is further configured to determine, based on the control signaling, a resource pool which can be used by the present network node when the present network node operates as the relay node.

9. The electronic device according to claim 4, wherein the processing circuitry is further configured to group slave network nodes accessed into the present network node after the present network node operates as the relay node, wherein the slave network nodes in a same group, when using same time-frequency resources to transmit data in the case of beam-forming, are subjected to interferences lower than a predetermined degree.

10. The electronic device according to claim 9, wherein the processing circuitry is configured to determine whether to activate the beam-forming function, and in the case of determining to activate the beam-forming function, allocate the same time-frequency resources to each of the slave network nodes in the same group.

11. The electronic device according to claim 9, wherein the processing circuitry is further configured to generate information about the grouping to be provided to the network control terminal, and perform communication with the slave network nodes using spectrum resources allocated by the network control terminal based on the grouping information.

12. The electronic device according to claim 11, wherein the processing circuitry is further configured to generate indicating information on whether to activate the beam-forming function to be provided to the network control terminal, and perform communication with the slave network nodes using spectrum resources allocated by the network control terminal based on the indicating information and the grouping information.

13. The electronic device according to claim 4, wherein the processing circuitry is further configured to generate, when determining that the present network node is to operate as the relay node, information on a request for serving as the relay node to the network control terminal.

14. The electronic device according to claim 13, wherein the processing circuitry is further configured to determine, based on a notification from the network control terminal, that the present network node is selected as the relay node.

15. The electronic device according to claim 14, wherein the notification further comprises one or more of the following: spectrum resources allocated by the network control terminal; and indicating information on whether the present network node is to activate the beam-forming function.

16. The electronic device according to claim 9, wherein the processing circuitry is further configured to group the slave network nodes based an interference map which represents interference conditions among respective slave network nodes when using the same time-frequency resources to communicate in the case of beam-forming.

17. A method for an electronic device of a network control terminal, comprising:
  setting a first condition about beam-forming capability of a network node, to be used for determining a network node which is capable of serving as a relay node, the first condition comprising a threshold for the number of directional beams that can be formed and/or a threshold for a range of angles of the directional beams;
  generating control signaling containing indicating information of the first condition, for instructing network nodes served by the network control terminal; and
  transmitting the control signaling to the network node so that the network node determines whether the network node is to operate as the relay node based on the first condition.

18. A method for an electronic device of a network node, comprising:
  determining, based on control signaling transmitted from a network control terminal, a first condition about beam-forming capability of the network node, the control signaling being generated at the network control terminal for instructing network nodes served by the network control terminal, and the first condition comprising a threshold for the number of directional beams that can be formed and/or a threshold for a range of angles of the directional beams; and
  determining, based on the first condition, whether the present network node is to operate as a relay node.

* * * * *